(12) United States Patent
Thatte et al.

(10) Patent No.: US 10,252,850 B2
(45) Date of Patent: Apr. 9, 2019

(54) CATALYTIC OXIDATION/REDUCTION COMPOSITIONS AND ARTICLES

(71) Applicant: Multisorb Technologies, Inc., Buffalo, NY (US)

(72) Inventors: Mrunal R. Thatte, Williamsville, NY (US); Stanislav E. Solovyov, Getzville, NY (US); Thomas H. Powers, Mayville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 529 days.

(21) Appl. No.: 14/911,141

(22) PCT Filed: Mar. 31, 2015

(86) PCT No.: PCT/US2015/023642
§ 371 (c)(1),
(2) Date: Feb. 9, 2016

(87) PCT Pub. No.: WO2016/159985
PCT Pub. Date: Oct. 6, 2016

(65) Prior Publication Data
US 2017/0036839 A1     Feb. 9, 2017

(51) Int. Cl.
| | | |
|---|---|---|
| *B65D 81/18* | (2006.01) | |
| *B01J 27/053* | (2006.01) | |
| *B01J 31/02* | (2006.01) | |
| *B01J 27/055* | (2006.01) | |
| *B01J 31/26* | (2006.01) | |
| *B01J 27/232* | (2006.01) | |
| *C02F 1/70* | (2006.01) | |

(52) U.S. Cl.
CPC ............ *B65D 81/18* (2013.01); *B01J 27/053* (2013.01); *B01J 27/055* (2013.01); *B01J 27/232* (2013.01); *B01J 31/0202* (2013.01); *B01J 31/0208* (2013.01); *B01J 31/0209* (2013.01); *B01J 31/26* (2013.01); *C02F 1/70* (2013.01); *C02F 2209/02* (2013.01)

(58) Field of Classification Search
None
See application file for complete search history.

(56) References Cited

U.S. PATENT DOCUMENTS

| | | |
|---|---|---|
| 5,393,809 A | 2/1995 | Gueret |
| 5,654,164 A | 8/1997 | Gardiol et al. |
| 5,977,212 A | 11/1999 | Ebner et al. |
| 5,980,956 A | 11/1999 | Petersen et al. |
| 2005/0205840 A1 | 9/2005 | Farneth et al. |

OTHER PUBLICATIONS

The PCT Search Report and Written Opinion dated Dec. 22, 2015 for PCT application No. PCT/US2015/023642, 17 pages.

*Primary Examiner* — Catherine S Branch
(74) *Attorney, Agent, or Firm* — Lee & Hayes, P.C.

(57) ABSTRACT

A redox composition includes a carbohydrate material and a catalytic molar amount of an organic compound positioned in catalytic relationship with the carbohydrate material to catalyze oxidation of the carbohydrate material in an environment in which the carbohydrate material would not otherwise oxidize.

21 Claims, 13 Drawing Sheets

700

PRODUCE AN AQUEOUS SOLUTION INCLUDING AN ENDIOL
702

APPLY THE AQUEOUS SOLUTION TO A SUBSTRATE INCLUDING CELLULOSE
704

FIG. 7

CATALYTIC OXIDATION/REDUCTION COMPOSITIONS AND ARTICLES

CROSS-REFERENCE TO RELATED APPLICATION

This Application is the National Stage of International Application No. PCT/US2015/023642, filed Mar. 31, 2015, the entire disclosure of which is incorporated herein by reference.

BACKGROUND

An oxidation/reduction (redox) process involves a transfer of electrons between one medium or compound and another medium or compound. The medium that loses or donates the electrons is oxidized in the process. The medium that gains or accepts the electrons is reduced in the process. A redox process can be a single step process in which a medium A accepts electrons from a medium C. Alternatively, a redox process can be a multistep process in which a medium A accepts electrons from a medium B, which in turn accepts electrons from a medium C. The net redox reaction being a transfer of electrons from medium C to medium A.

Oxygen can have undesirable effects on many products. For example, oxidation can cause degradation such as corrosion, or in the case of food products, oxidation can result in spoilage or discoloration. Oxygen absorbers or scavengers are often used in commercial product packaging to remove oxygen from an environment in an effort to minimize oxidation, e.g., to preserve food or medical products. Powdered iron is commonly used in commercial oxygen absorbers because it is relatively inexpensive and readily combines with oxygen at relatively low temperatures in the presence of a promoter to form iron oxide, i.e., rust.

However, iron is not suitable for all applications. While relatively inexpensive, it is still too costly in some instances. Moreover, some applications use metal detectors to identify contaminants, and iron cannot be used because it triggers these detectors.

U.S. Pat. No. 5,977,212 describes an ascorbate salt based oxygen scavenging composition with catalytic amounts of a first-row, transition metal compound such as an organic or inorganic compound of iron or copper. The composition is supported on a high surface area, microporous particulate material that has been impregnated with the composition. The carrier can be a polymer matrix, a film or mat (woven or non-woven), or a moisture permeable pouch or sachet which contains the supported oxygen scavenging composition. The '212 Patent describes an oxygen scavenging composition that includes about 1 part ascorbate and small amounts of $Cu^{2+}$ supported on about 5 parts silica. This composition is then mixed with plastic, e.g., PVC, resin and formed into package films.

U.S. Patent Publication No. 2005/0205840 describes an oxygen scavenging system that includes laccase enzyme, a compound that serves as a reducing agent, and a functional barrier permeable to oxygen. Laccase enzyme is capable of accepting electrons from many known reducing agents, and transferring those electrons to reduce oxygen to water. Butylated hydroxyanisole, butylated hydroxytoluene, tertiary-butylated hydroquinone, ascorbic acid (and its salts) and iso-ascorbic acid (and its salts) are said to be the preferred reducing agents for the laccase. The system can also include a support material for the composition, such as wood pulp filter paper, glass fiber filter paper, paperboard, fabric, nonwoven fabrics, polymer films and label stock, polymeric materials, a mat, a card, a disk, a sponge, and polymeric foam. There is no suggestion that any of these materials participate in the reaction.

SUMMARY

Aspects of this disclosure describe a redox composition including a carbohydrate material and a catalytic molar amount of an organic compound positioned in catalytic relationship with the carbohydrate material. The carbohydrate material may be a mono-saccharide, a disaccharide, an oligo-saccharide, or a polysaccharide compound. Further, it can be any material that contains structural features that are, in-part or entirely, monosaccharide, disaccharide, oligosaccharide, or polysaccharide compounds. The organic compound may include at least one carbon-carbon double bond and at least one hydroxyl group.

In other aspects, a redox composition includes a carbohydrate material and an effective amount of an organic compound positioned on the carbohydrate material. The organic compound is selected from the group consisting of an enediol and/or a phenol. The carbohydrate material and the organic compound are present at a weight ratio of carbohydrate material:organic compound in an amount sufficient for the organic compound to catalyze the oxidation of the carbohydrate material, for example a range of 1:1 to 200:1, though more of the organic compound may be present.

In some implementations, this disclosure describes an article used to preserve a product sensitive to oxygen, as well as scavenging molecular oxygen contained in any given volume of interest. The article includes a redox composition that can be positioned anywhere on a surface of a package member that comprises a carbohydrate, or positioned anywhere within a package enclosure that contains the product sensitive to oxidation.

BRIEF DESCRIPTION OF THE DRAWINGS

FIG. 7 illustrates a flow diagram of a process to produce an aqueous solution that includes an enediol and apply the aqueous solution to a carbohydrate material.

DETAILED DESCRIPTION

Figure 1:
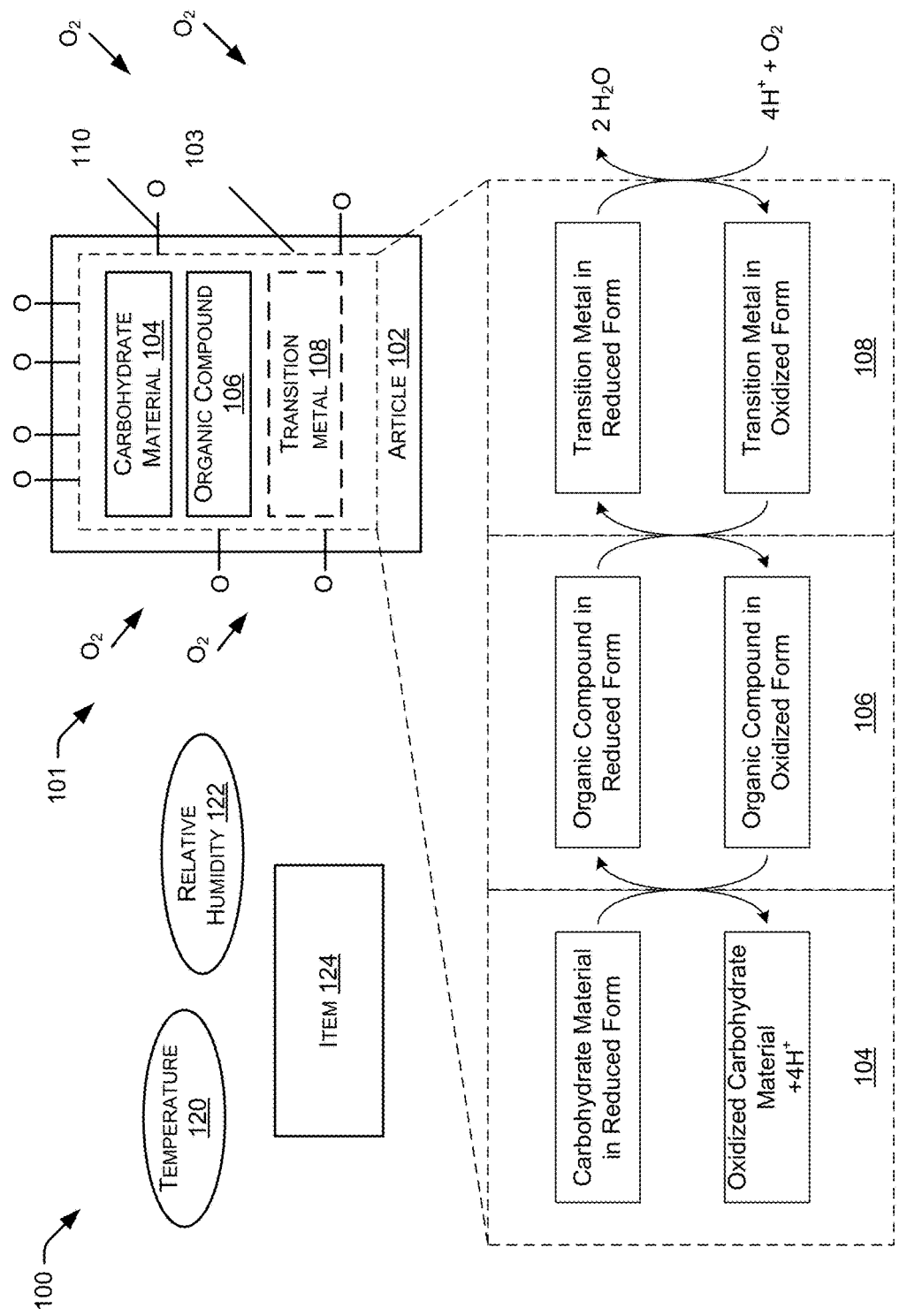
FIG. 1 illustrates an environment including an article having a redox composition.

The articles and compositions described herein participate in one or more catalyzed redox processes. In some embodiments, the compositions are the articles that participate in the redox processes, and in other embodiments, the compositions are part of the article. The compositions can be used to reduce any compound of interest and effectively remove the compound of interest from an environment. For example, the redox compositions or articles can be used to remove or reduce undesired gases from an environment including many industrial processes. Oxygen is an exemplary gas of interest to be removed from an environment. However, this disclosure is not limited to removing oxygen alone. In some embodiments, the articles or compositions can be used to reduce one or more of these gases to forms that are chemically different, e.g., oxygen to water. The articles or compositions can be used to remove undesirable organic compounds, particularly toxic or odorous compounds from an environment. The compositions can be used to reduce these compounds to non-toxic or non-odorous compounds.

The described articles or compositions may have many advantages over previously known reducing systems. For example, the material that undergoes oxidation, i.e., the material that is the source of electrons, in the described redox process can be a relatively inexpensive and abundant material. In many embodiments, the material undergoing oxidation is a natural material or is derived from a natural material, and therefore is biodegradable. In fact, the composition can include any carbohydrate material such as a monosaccharide, a disaccharide, an oligo-saccharide, or a polysaccharide. Exemplary materials included in the articles or compositions include, but are not limited to, natural fibers such as paper, paper pulp, cotton, grasses, starch, saw-dust, and any natural or modified cellulose material. The material that undergoes oxidation need not oxidize directly at the temperatures at which the composition is used. A multistep catalyzed process permits oxidation at lower temperatures than would be required for direct oxidation.

It must be noted that, as used in the written description and the appended claims, the singular forms "a," "an" and "the" include plural referents unless the context clearly dictates otherwise. Thus, for example, reference to "an organic compound" includes mixtures of two or more organic compounds.

"Optional" or "optionally" means that the subsequently described event or circumstance can or cannot occur, and that the description includes instances where the event or circumstance occurs and instances where it does not.

It will be further understood that the endpoints of each of the ranges are significant both in relation to the other endpoint, and independently of the other endpoint. It is also understood that there is a number of values disclosed herein, and that each value is also herein disclosed as "about" that particular value in addition to the value itself For example, if the value "10" is disclosed, then "about 10" is also disclosed. It is also understood that throughout the application, data is provided in a number of different formats, and that this data represents endpoints and starting points as well as ranges for any combination of the data points. For example, if a particular data point "10" and a particular data point "15" are disclosed, it is understood that 10 and 15 are considered disclosed. It is also understood that each unit value between two particular unit values is also disclosed. For example, if 10 and 15 are disclosed, then 11, 12, 13, and 14 are also disclosed.

Embodiments of this disclosure are directed to a redox composition comprising a carbohydrate material and an organic compound in a mobile phase positioned in catalytic relationship with the carbohydrate material. The organic compound may have at least one carbon-carbon double bond and at least one hydroxyl group. The redox composition can also include a metal. The metal may be a metal salt that may dissociate into a metal cation and the corresponding counter anion. The dissociated metal ion may further be in a state of a coordinated complex with the available ligands present in the embodiments of this disclosure. Use of the word "metal" and the phrase "transition metal" in this specification are meant to include all possible forms of a metal salt such as the salt itself, the dissociated salt and complexes of the metal cation with available ligands.

In some embodiments, the carbohydrate material serves as the primary reductant material in the redox composition, e.g., the carbohydrate material provides a source reservoir of electrons that are to be transferred to a compound of interest. Accordingly, the carbohydrate material may account for most of the material on a per weight basis in the redox composition, not including the weight associated with an optional structural support and/or carrier. In contrast, the organic compound may be present in a catalytic molar amount. When used, the metal may also be present in a catalytic molar amount, typically a smaller amount than the organic compound. It is proposed that the organic compound is catalytically associated with the carbohydrate material and the optional metal is catalytically associated with the organic compound, to reduce a compound of interest in an environment. The environment in question, whether ambient, refrigerated, or otherwise, is generally understood not to be suitable for the direct reduction of the carbohydrate to proceed at an acceptable rate (or at all) without use of a catalyst. Thus, for example, in some embodiments, the carbohydrate material by itself may be unable to reduce the compound of interest in the low temperature environment in question, at a suitable rate, if at all. However, inclusion of the organic material and/or the metal, catalyzes the reduction of the compound of interest by the carbohydrate material at a low temperature. Conventional systems may rely on biological catalysts, i.e., enzymes, to accomplish a much more limited set of objectives compared to those described herein, e.g., an enzyme-catalyzed oxidation of ascorbates. For example, most cellulose-based carbohydrate materials are stable at ambient and refrigerated conditions and they will not serve as reductants for diatomic oxygen. In some embodiments of this disclosure, a catalytic system may effectively support the desired redox reaction of carbohydrate materials in the desired range of temperatures and water activities without the use of biological catalysts. In some embodiments, for example, the catalyst may be an ascorbate. While the oxidation of the carbohydrate material is catalyzed by the organic material, providing the benefits mentioned above, another benefit is that the carbohydrate material is believed to absorb more oxygen per unit of weight than the organic material. Therefore, even a minor percentage of carbohydrate material relative to the organic material provides an advantage of increased absorption capacity. Thus, unlike some catalytic systems, the catalytic organic material may be present in relatively large proportion to the carbohydrate material. Therefore, as used herein, the catalytic relationship between the organic material in the carbohydrate material does not require any particular relative amounts of the two materials but rather describes a system in which oxidation of the carbohydrate material is catalyzed by the organic material at temperatures at which the carbohydrate material would not otherwise oxidize directly.

A person of ordinary skill in the art begins with an understanding that most catalytic reactions are complex at the molecular level, and the presence of a catalyst in a chemical system will increase the rate of an already thermodynamically favored reaction though that same reaction may be highly disfavored kinetically. A catalytic reaction is often viewed as participating in a cyclic reaction process. The same person understands that a catalyst is not typically consumed in the reaction, however, over the time course of a reaction a catalyst can become deactivated or inhibited or simply be consumed by secondary reactions. Often the term "catalytic turnover" is used to estimate the number of times a catalyst can participate or assist in a chemical reactive cycle before it becomes deactivated or ineffective due to irreversible chemical changes in its constitution through secondary chemical pathways. Accordingly, a person of skill can recognize a compound or complex as a catalyst in a chemical system by (1) the relative molar concentration of the catalyst relative to the molar concentration of initial chemical reagents at beginning of the reaction, or by the relative molar concentration of product formed by the end of a reaction; or (2) by the observed difference in the rate or efficiency of a chemical reaction in the presence of and in the absence of the catalyst. In most catalytic reactions, a catalyst is present at relatively low molar concentrations relative to the molar amounts of desired product formed. However, higher concentrations of catalyst do not change the fact that a material acts as a catalyst and may delay catalytic turnover.

The term "catalytic molar amount" refers to a molar concentration of an organic compound, or a metal, in a redox composition that is less than stoichiometric molar amount of an organic compound, or a metal, required to reduce a similar mole amount of a compound of interest.

The term "catalytic relationship" refers to any arrangement in which a catalyst catalyzes a desired chemical reaction.

As stated, catalytic reaction processes are complex, and often chemical scientists will use and suggest a chemical model that may explain the observed reaction chemistry of a catalytic process. The chemical model, and possible chemical intermediate species proposed by the model, may not be correct, and it may also be very difficult to demonstrate with instrumental evidence. That said, and without further limiting the language of any patent claim, it is proposed that redox compositions described herein may perform as illustrated in FIG. 1B. More specifically, the organic compound present in the redox composition participates in a catalytic oxidation/reduction process. In other words, the organic compound is believed to cycle between a reduced form, i.e., an electron-rich form, and an oxidized form, i.e., an electron-poor form. It is further proposed that an electron-rich form of the organic compound is able to transfer one or more electrons directly or indirectly to a compound of interest, and thereby, assist in the chemical reduction of the compound of interest. Following the transfer of the one or more electrons, the organic compound is then present in its electron-poor form. It is further proposed that the electron-poor form of the organic compound is able to accept electrons from the carbohydrate material returning to an electron-rich form and the cycle of electron transfer to a compound of interest is thus repeated. The above described chemical model helps to explain the observed reaction chemistry in which the carbohydrate material is oxidized and the organic compound is reduced. The reduced organic compound is later oxidized via known catalytic routes and the cycle repeats itself as long as the part of the carbohydrate material acting as a reductant is not completely oxidized, or until the compound of interest is no longer available.

The carbohydrate material comprises mostly carbon, hydrogen, and oxygen atoms. Conventionally, a carbohydrate material, specifically a mono-saccharide, may be represented by the empirical formulas, $C_n(H_2O)_n$ where n can typically be 3 to 6. This empirical formula is provided only as a representative class of carbohydrate material. For example, there are known "de-oxy" forms of carbohydrates that cannot be represented by the empirical formula $C_n(H_2O)_n$. Furthermore, disaccharides, oligo-saccharides and polysaccharides depart from this general empirical formula, but may be used in some implementations of this disclosure. Therefore, the term "carbohydrate material" is not limited by the empirical formula given above. A carbohydrate material may be naturally occurring, or may be chemically substituted at one or more carbons with a functional group, e.g., an amino, a carboxylic acid or ester, or thio- or phosphate ester, etc. Chemically, carbohydrates are classified as saccharides, which include monosaccharides, disaccharides, oligosaccharides, and polysaccharides. Monosaccharides and disaccharides, which are lower molecular weight carbohydrates, are sometimes commonly referred to as sugars. For example, glucose is a monosaccharide found in grape juice, sucrose is a disaccharide found in sugar cane, and lactose is the disaccharide found in milk. Lactose, shown below, is a disaccharide derived from the condensation of galactose and glucose, which form a β-1→4 glycosidic linkage. In living organisms, saccharides serve for the storage of energy (e.g., starch and glycogen), and as structural components, e.g., cellulose in plants.

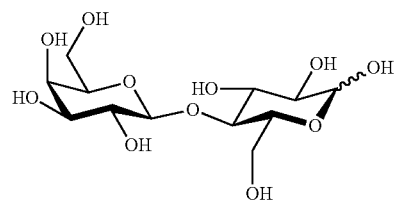

Cellulose is a carbohydrate material, and in most natural forms, is likely to have an empirical formula $(C_6H_{10}O_5)_n$, where n represents the number of saccharide units in the cellulose. The empirical structure is shown below. For example, a cellulose polysaccharide can have a linear chain structure of several hundred to over ten thousand β(1→4) linked D-glucose units. For example, and although the actual numbers may vary, cellulose from wood pulp may have typical chain lengths between 300 and 1700 glucose units and cotton and other plant fibers, as well as bacterial cellulose, have typical chain lengths ranging from 800 to 10,000 glucose units. Moreover, the cellulose content of cotton fiber is typically about 90%, that of wood is about 40-50%, and that of dried hemp is about 45%.

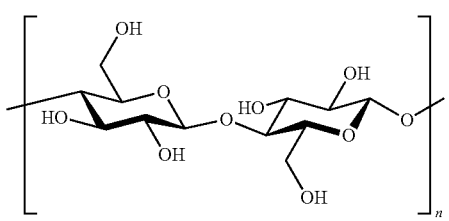

A cellulose material predominantly includes β(1→4)-glycosidic bonds, commonly referred to as a β(1→4)-linkage. This β(1→4)-linkage contrasts with that of an α(1→4)-glycosidic bond or an α(1→4)-linkage, which is predominantly present in starch and also in other polysaccharides. In many of the redox compositions, the carbohydrate material will have a cellulose content greater than 50% and have predominantly β(1 →4)-linkages.

Examples of readily available natural cellulose materials that can be used in the redox composition include, but are not limited to, wood pulp, cotton, and agricultural and industrial waste fibers such as ground coconut hulls, sawdust and the like. Other natural cellulose materials include galactomannans. Galactomannans are polysaccharides consisting of a mannose backbone with galactose side groups, more specifically, a (1-4)-linked β-D-mannopyranose backbone with branchpoints from their 6-positions linked to α-D-galactose, i.e. 1-6-linked α-D-galactopyranose. Examples of some common galactomannans include, but are not limited to, guar gum and locust bean gum.

Examples of readily available modified cellulose materials that can be used in the redox composition include, but are not limited to, carboxymethyl cellulose, hydroxypropylmethyl cellulose, methyl cellulose, hydroxymethyl cellulose, hydroxyethyl cellulose, hydroxypropyl cellulose as well as any of the above natural cellulose materials that have undergone some form of pre-treatment to reduce the solution viscosity or other chemical modifications such as etherification, esterification, oxidation, substitution, or the like. The pre-treatment to accomplish reduction in solution viscosity will be referred to here as hydrolysis although it could very well be a combination of hydrolysis, which generally refers to as consuming one molecule of water per hydrolysis site, as well as chain scission by other chemical or enzymatic means.

A carbohydrate material of particular interest in the described redox composition may be referred to as a hydrolyzed carbohydrate. A hydrolyzed carbohydrate is a carbohydrate that has been pre-conditioned to provide for a shortening of the polysaccharide chain, i.e., to provide a lower number average molecular weight ($M_n$). The hydrolyzed carbohydrate may be a hydrolyzed, natural carbohydrate, or a hydrolyzed, modified carbohydrate. The hydrolyzed carbohydrate may have a number average molecular weight of less than about 50,000. In some instances, the hydrolyzed carbohydrate may have a number average molecular weight of less than 20,000. In some examples, the hydrolyzed carbohydrate may be hydrolyzed cellulose, such as hydrolyzed modified cellulose.

There are generally two conventional methods in the art to hydrolyze a carbohydrate, chemically and enzymatically. As an example, we will describe the hydrolysis of a cellulose material. One chemical method to hydrolyze modified cellulose is hydrogen peroxide. In many instances, the redox composition will comprise modified cellulose, e.g., readily available carboxymethyl cellulose that has been pre-treated with hydrogen peroxide in the presence of a catalytic amount of transition metal salt, preferably Cu(II) and/or Fe(II). Of course, enzymatic methods of hydrolyzing natural and modified cellulose are also well-known, and can be a source of hydrolyzed cellulose that can be used in the redox composition.

The carbohydrate material in the redox composition is believed to be the primary source of available electrons, and therefore, is likely to account for at least 60% by weight, or at least 75% by weight, of the redox composition, not including the weight provided by any non-active components of embodiments including any optional carrier or structural support that is used to support the redox composition. The non-active components are components of embodiments that, to the person skilled in the art, are not expected to participate chemically in the various chemical processes taking place. It is believed that the carbohydrate material functions as an electron storage material in the redox composition, and catalyzed by the organic compound, the carbohydrate material is used to reduce a compound of interest.

The organic compound may include at least one carbon-carbon double bond and at least one hydroxyl group and is provided in the redox composition in a mobile phase. As used herein, the term "mobile phase" means a phase that promotes transfer of electrons, for example, in liquid water. Because the organic compound is present in a catalytic molar amount in the redox composition, the redox composition can be prepared using a fully reduced form of an organic compound, a partially oxidized form of the same organic compound, or a fully oxidized form of the same organic compound. We believe redox compositions that are prepared using the same amounts of ascorbate or dehydroascorbate, for example, with everything else being the same, have the equivalent capability to reduce oxygen.

In many embodiments, the organic compound will include any one or more organic compounds having at least one hydroxyl group and a carbon-carbon double bond. For example, the organic compound may be an enediol, a phenol or a mixture thereof.

An enediol compound suitable for the redox composition can be a compound having two hydroxyl groups on adjacent carbon atoms which are connected with an ethylenic double bond. Examples of enediol compounds of this type include ascorbate, squaric acid, dibydroxymaleic acid, rhodizonic acid, and dibydroxyfumaric acid. A preferred enediol compound may be an ascorbate compound.

The term "ascorbate compound" as used herein refers to ascorbic acid in either its D- or L-form and any stereoisomers including diastereomers of ascorbic acid or its salts including erythorbic acid and its salts and mixtures thereof. It may be preferred that the ascorbate compound be selected from D- or L-ascorbic acid, their alkali and alkaline earth metal salts (e.g., sodium, potassium or calcium salts etc.), fatty acid derivatives of ascorbic acid, as well as mixtures thereof. Certain of the above ascorbate compounds, such as sodium ascorbate salts, may be useful if the redox composition is to be used in a food related application. The term "ascorbate" also includes oxidized forms of ascorbate, e.g., dehydroascorbate.

The term "phenol" as used herein refers to compounds having an aromatic ring or condensed aromatic ring with at least one hydroxyl group. The aromatic ring or condensed aromatic ring moiety can further carry substituent groups such as alkyl, aryl, alkaryl amine, amide, ether (e.g., methoxy), hydroxyl or carbonyl functional group. The phenol compound can be in its free form or can be in the form of an alkali or alkaline earth metal salt. Examples of phenol compounds include, phenol, resorcinol, pyrogallol, pyrocatechol monoethyl ether, resorcinol monoethyl ether, hydroquinone, catechol, 1,2,4-trihydroxy benzene, tetrahydroxy-1,4-benzoquinone, 2,4-dibutylphenol, 2,6-dibutylphenol and the like.

In other embodiments, it may be advantageous to use an organic compound in the redox composition, such as an α-hydroxy ketone, a vicinal diol, or a vicinal ketone.

The organic compound is not an enzyme. An "enzyme" may be defined as a protein with peptide linkages and a molecular weight of multiple Dalton units. Proteins also differ in their secondary, tertiary and quaternary structures a characteristic that organic compounds generally do not tend to exhibit. Accordingly, as used herein organic compound excludes enzymes.

The organic compound is present in the redox composition in a catalytic molar amount. In terms of a given weight percent, the organic compound can be present in the redox composition in a range from about 0.01% by weight to about 50% by weight, about 0.01% by weight to about 20% by weight, about 0.01% by weight to about 10% by weight, about 0.01% by weight to about 2% by weight, or about 0.01% by weight to about 0.5% by weight based on the total weight of the redox composition. The weight percentages do not include weights accounted for by any optional structural support. Regardless of the percent content of organic compound and carbohydrate material, in embodiments of this disclosure, the organic compound is present in an amount that catalyzes the oxidation of the carbohydrate material.

FIG. 1A illustrates one embodiment of this disclosure and includes an article 102 positioned within an environment 100 containing a compound of interest 101 to be removed from the environment. Here, the compound of interest 101 is oxygen. The article 102 includes a redox composition 103 including a carbohydrate material 104, an organic compound 106, and a metal 108. Although illustrated in FIG. 1A, the metal 108 may be optional in some embodiments. The carbohydrate material 104 may be the carbohydrate material discussed above. For example, the carbohydrate material can include one or more polysaccharide-based materials considered by those skilled in the art to be either polymers, oligomers, dimers and/or monomers of sugar units, e.g., glucose, galactose, mannose, or the like, or a combination thereof. The organic material 108 may be the organic material described above. The organic material is in a mobile phase and is positioned in catalytic relationship with the carbohydrate to act as a catalyst to promote the reaction of the carbohydrate material with a compound of interest.

The metal 108 is a transition metal and may be optionally included to facilitate the reduction of the compound of interest 101 in the environment 100. The metal 108, like the organic compound 106, can be present in a catalytic molar amount and in catalytic relationship with the organic compound, and thereby function as a catalyst in the oxidation/reduction process resulting in the chemical reduction of the compound of interest. In FIG. 1A, the compound of interest 101 is oxygen and may be reduced to water. In accordance with the above catalytic redox model, it is proposed that the metal 108 is chosen to donate one or more electrons, e.g., to the compound of interest that is to be reduced, and accept one or more electrons, e.g., from the organic compound 106. The proposed system is distinct from previous, metal-based oxygen scavengers, because the metal 108 may be provided in a catalytic molar amount, which, as described above, is less than an amount needed to fully oxidize the entirety of the compound of interest 101. When included in the article 102, the metal 108 is provided in such a relatively small amount that it alone could not sufficiently oxidize the compound of interest.

A person of ordinary skill in the art with the benefit of this disclosure will understand that the metal 108 may include a single metal or any different mixtures or combinations of metals that can participate in one or more redox-type reactions to reduce the compound of interest in the environment 100. In many instances, the metal is added to the redox composition in the form of an organic or inorganic salt, or as a complex or chelate. For example, the metals iron and/or copper can be used to prepare the redox composition by adding the metals in the form of an inorganic compound such as copper(II) sulfate or iron(II) sulfate and the like. Preferred metal compounds may include transition metals, preferably transition metals of the first row of the Periodic Table forming the series from scandium to zinc (i.e., Sc, Ti, V. Cr, Mn, Fe, Co, Ni, Cu and Zn). It is also well understood that a transition metal can be added to the redox composition in the form of an organic complex, e.g., a metal cation bound to ethylene diamine tetracetic acid (EDTA) or its alkali salts as, for example, iron complexes of EDTA (e.g., monoferrous disodium EDTA; monoferrous monosodium EDTA and the like).

In one illustrative example, the metal 108 can include iron. In another illustrative example, the metal 108 can include copper. Further, the redox composition can be prepared by including both transition metals as an inorganic salt with any relatively stable oxidation state, such as $Cu^{2+}$, $Cu^{1+}$, $Fe^{3+}$, $Fe^{2+}$, or any combination thereof.

Like the organic compound 106, the metal 108 can be present in a catalytic molar amount. Possible catalytic molar amounts of metal 108 in the redox composition 101 can be in a range of from about 1 ppm to about 10,000 ppm, from about 1 ppm to about 5000 ppm, from about 1 ppm to about 1000 ppm, from about 1 ppm to about 250 ppm, from about 1 ppm to about 50 ppm, and from about 1 ppm to about 10 ppm, based on the total weight of the redox composition 101, not including the weight provided by any optional structural support that may be used to support the redox composition. Regardless of the concentration of the individual metal content, the metal or the metals can effectively transfer electrons from the organic compound to the compound of interest, for example oxygen.

In some embodiments, the redox compositions are the articles that scavenge oxygen, and in other embodiments, the redox compositions are contained within the article. In particular, the articles and redox compositions can be used to scavenge oxygen in an environment, and thereby, reduce the concentration of oxygen in that environment.

Carbohydrate materials such as wood pulp, cotton or other natural cellulosic materials do not react with oxygen at ambient conditions, e.g., near room temperature and atmospheric pressure. Most certainly, these materials do not reduce oxygen to water under ambient conditions. In contrast, the articles and redox compositions according to this disclosure that include a carbohydrate material including cotton, wood pulp and/or many cellulose materials can reduce oxygen to water at ambient conditions as well as at reduced temperature conditions, for example from about 2° to about 5° C. In this way, the articles and redox compositions described herein can be used as oxygen scavengers and thereby reduce oxygen in many environments. For example, the articles can be packaged with food such as baked goods, oil-based snacks; nutraceuticals; and pharmaceuticals to minimize the oxidation of such products during storage, and thus extend the shelf life of such products. To illustrate, the redox compositions described herein can be designed to reduce at least about 10 cm³ of ground state oxygen per gram of composition in less than 100 hours.

In accordance with the observed reaction chemistry and the proposed model, the redox composition 103 can include a plurality of active sites 110 that chemically or physically or by both means interact with or bind a compound of interest that is to be reduced. As noted above, FIG. 1A depicts oxygen as the compound of interest 101 in the environment 100. It is proposed that there are a plurality of sites 110 located on or within the redox composition 103 at which the oxygen is reduced. Sites 110 can be metal-based, or the sites 110 can be associated with the organic compound. In some cases, the oxygen in the environment 100 can be reduced through a multi-step redox reaction that involves electrons being shared or transferred between the carbohydrate material 104, the organic compound 106, and the metal 108. Because the organic compound 106 and the metal 108 can be utilized in catalytic amounts in relation to the amount of carbohydrate material 104 present in the redox composition 101, and more importantly, relative to the molar amount of oxygen that is reduced, it is proposed that the organic compound and the metal serve a catalytic role in the redox composition 103, as opposed to directly absorbing the bulk of the oxygen. Accordingly, it is proposed that the organic compound 106 and the metal 108 cycle between a reduced and an oxidized state(s) in the redox composition 101. FIG. 1B is a schematic representation of such a reaction.

In FIG. 1B, as in FIG. 1A, the redox composition 101 includes the carbohydrate material 104, the organic compound 106, and the transition metal 108. As illustrated, oxygen, the compound of interest, is reduced to water as the carbohydrate material oxidizes. The oxidation of the carbohydrate material is catalyzed by electrons available as a result of oxidation of the organic compound. Similarly, the oxidation of the organic compound is catalyzed by electrons available as a result of oxidation of the transition metal. In this manner, each of the transition metal and the organic compound alternate between a reduced form and an oxidized form, catalyzing oxidation of the carbohydrate material 104. The carbohydrate material 104 alone would be ineffective at reducing the oxygen at an acceptable rate, if at all.

In one implementation of a redox composition 103, the organic compound 106 can include any compound with enediol or phenol functionality. The article 102 can include an enediol or phenol, or a mixture thereof to donate electrons, accept electrons, or both in one or more reactions to reduce oxygen in the environment 100. In illustrative examples, the enediol may be ascorbate and the phenol may be catechol.

The redox composition 103 can also include additional components not shown in FIGS. 1A or 1B. At least some of the additional components can be involved in the oxidation reactions and reduction reactions that take place to reduce the oxygen in the environment 100. For example, the article 102 can include an imide, such as an N-hydroxyl imide, e.g., N-hydroxy succinimide. In the illustration of FIG. 1B, the imide may be schematically illustrated between the carbohydrate material 104 and the organic compound 106, as it may further catalyze the oxidation of the carbohydrate material. In another example, the article 102 can include an amount of water.

The article 102 can also include a dye, for example, to indicate when the carbohydrate material 104 of the article 102 is in or approaching an oxidized form that is not as effective in reducing oxygen in the environment. A dye in the redox composition can provide a visual color indication as to when the article is approaching exhaustion, i.e., losing its ability to scavenge oxygen, and thus could be discarded or replaced. It is proposed that the dye like the carbohydrate material or organic compound can participate in one or more redox reactions, however, it is believed that the dye compound is not as kinetically favored. As the carbohydrate material nears its capacity, the dye compound oxidizes and changes color. An exemplary dye is erioglaucine disodium salt, also known as Brilliant Blue FCF. Other dyes, including those from the triaryl methane category of dyes, such as malachite green, can function in an analogous way.

Figure 2:
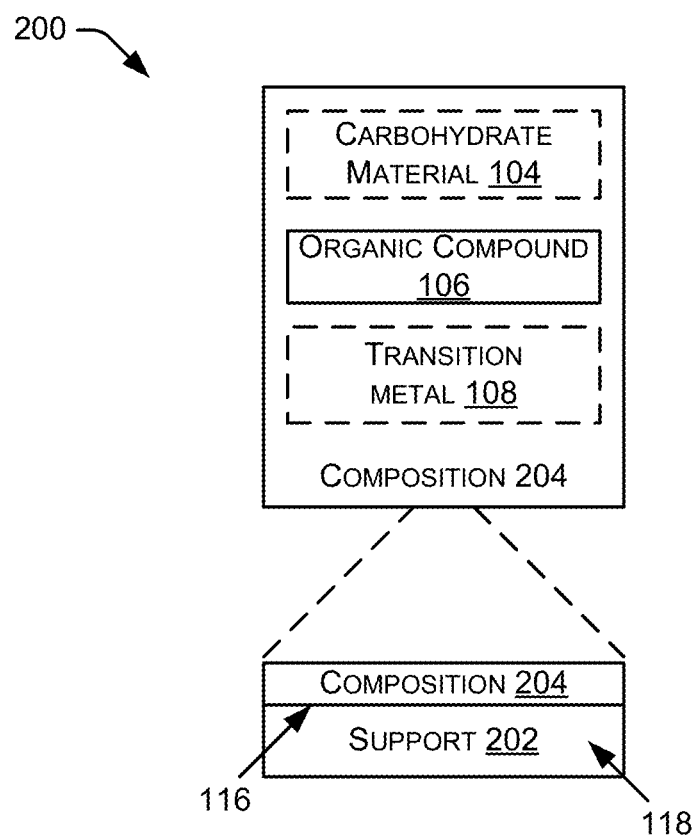
FIG. 2 illustrates an alternative embodiment of an article having a redox composition according to another embodiment of this disclosure.

In some implementations, as illustrated in FIG. 2, an article 200 can be embodied as a support 202 and a redox composition 204, like the redox composition 101 of FIG. 1, disposed on the support 202. In implementations, the support 202 can include a structural support, which may be made from cellulose, cotton, duck cloth, cotton roll, paperboard and/or wood pulp. In these implementations, the support may also provide some or all of the carbohydrate material 104. For example, the support 202 may include the carbohydrate material 104 and the organic compound 106 (and the transition metal 108, when used) may be disposed on the support 202, and thereby in catalytic relationship with the carbohydrate material 104.

In other implementations, the support 202 can include a plastic. In one example, the redox composition 204 can be applied as a film or coating on one or more surfaces of the support 202. The film or coating can be formed on the support 202 through a printing or screen printing process. In other embodiments, a film or coating can be formed on support 202 by immersing the support 202 in a solution including the composition 204. The composition 204 disposed on the support 202 includes components that participate in the redox reactions to reduce the oxygen of the environment. For example, the composition 204 includes one or more carbohydrate materials 104, organic compounds 106, and, optionally, metals 108.

In the foregoing embodiments, the redox compositions 101, 204 can include at least 50% by weight of carbohydrate material 104, and 0.1% to 50% by weight of the organic compound 106. In other embodiments, the compositions 101, 204 can include at least 60% by weight of the carbohydrate material 104, and 0.1% to 40% by weight of the organic compound 108. Additionally, the compositions 101, 204 can include at least about 70% by weight of the carbohydrate material 104, and 0.1% to 30% by weight of the organic compound 106. In still other embodiments, the compositions 101, 204 can include at least about 80% by weight of the carbohydrate material 104, and 0.1% to 20% by weight of the organic compound 108.

As noted above, in some instances, the compositions 101, 204 can include enough metal to hydrolyze the organic compound, for example, at least about 2 parts per million (ppm) of metal 108, at least about 10 ppm of metal 108, or at least about 25 ppm of metal 108 and up to about 10,000 ppm. In an illustrative example, the compositions 101, 204 include an amount of metal 110 included in a range of about 1 ppm to about 150 ppm or more. In another illustrative example, the compositions 101, 204 include an amount of metal 110 included in a range of about 2 ppm to about 40 ppm or more.

The compositions 101, 204 can also include amounts of other components, such as an amount of water (which is not included in the total weight of compositions 101, 204), an amount of an imide, such as an N-hydroxyl imide sufficient to further facilitate the redox reaction, an amount of an additional metal, or combinations thereof. For example, the compositions 101, 204 can include an amount of an imide included in a range of about 0.2% by weight to about 10% by weight. The compositions 101, 204 can also include an amount of an imide of about 0.4% by weight to about 3% by weight. Further, the compositions 101, 204 can include an amount of one or more additional metals required to facilitate the redox reaction, for example about 2 ppm to about 100 ppm.

In some embodiments, the support 202 may include a carrier for carrying the composition 204. Any known carrier can be used including, but not limited to, silica, alumina, diatomaceous earth, activated carbon, zeolites and clays. The carrier can be a porous particulate material throughout which the redox composition 204 is distributed. The porous particulate material should generally be a high surface area particulate material. The higher the surface area of the structural support, the faster the redox reaction will proceed. For example, the surface area (BET) may be from about 10 to about 500 square meters per gram. The greater the pore volume, the greater the capacity of the structural support to hold the redox composition. For example, the pore volume of the particulate material should be at least about 0.07 $cm^3$/gm, or in the range of about 0.07 to 4 $cm^3$/g, or about 0.1 to 2 $cm^3$/g. The particle size of the support material can range from about 0.1 µm to 500 µm, or preferably in some embodiments from about 1 µm to 25 µm.

The particulate material may be composed of a material that has a low degree of water solubility or is substantially water insoluble to provide a material that is substantially insoluble. For example, where the packaged product is organic, the material may have some degree of water-solubility. However, if the packaged product has an aqueous component, the material chosen should be water-insoluble. Representative of particulate materials which are insoluble in water and which may be used, alone or in combination, are for example, metal oxides or hydroxides, such as those of silicon, aluminum, calcium, metal carbonates such as those of calcium and magnesium; minerals such as montmorillonite, kaolite, attapulgite, sepiolite, diatomaceous earth, talc, vermiculite, and synthetic and natural zeolites; precipitated metal silicates such as calcium silicate and aluminum polysilicate; alumina silica gels; activated carbon; aluminum phosphate; and the like. Silica and diatomaceous earth may be some of the more presently preferred supports due to their availability and cost considerations.

In some embodiments the articles 102, 200 may include a container. For example, the articles 102, 200 1 may include a sachet holding the redox composition 103, 204, as is conventional in the oxygen scavenging arts. In these examples, the composition may be disposed on a support, such as the carrier described above. As one non-limiting, potential application of the presented art, the polysaccharide material source as claimed in the present invention can be a "paper-backed" or "paper" tray or other container type article based on a paper pulp, cotton duck cloth or cardboard source with or without the presence of a laminating layer, such that the container like article itself can perform the function of an oxygen absorber.

The environment 100 can also be associated with one or more conditions that can have an effect on the reduction of oxygen in the environment 100 by article 102. For example, the environment 100 can be at a certain temperature 120 and a certain relative humidity 122 that may vary with time or place or application requirements. In some implementations, an amount of the oxygen in the environment 100 can be reduced by article 102 at a temperature no greater than about 50° C., no greater than about 40° C., or no greater than about 30° C. Additionally, an amount of the oxygen in the environment 100 can be reduced by article 102 at a temperature of at least about 2° C., at least about 5° C., at least about 10° C., or at least about 15° C.

Additionally, the environment 100 can be at a relative humidity 122 of at least about 2%, at least about 8%, at least about 15%, at least about 25%, at least about 50%, at least about 75%, at least about 95%, or about 100%. In another illustrative example, the environment 100 can have a relative humidity 122 included in a range of about 2% to about 50%.

The amount of ground state oxygen in the environment 100 that is reduced by article 102 can vary depending upon the size and quantities of active materials used in an embodiment. For example, the amount of ground state oxygen in the environment 100 that is reduced by article 102 can be at least 5 $cm^3$/g of redox composition 101, at least 15 $cm^3$/g of redox composition 101, at least 25 $cm^3$/g of redox composition 101, at least 35 $cm^3$/g of redox composition 101, at least 45 $cm^3$/g of redox composition 101, or at least 55 $cm^3$/g of redox composition 101. In an illustrative example, the amount of oxygen in the environment 100 that is reduced by article 102 can be included in a range of 10 $cm^3$/g redox composition 101 to 65 $cm^3$/g of redox composition 101. In another illustrative example, the amount of ground state oxygen in the environment 100 that is reduced by article 102 can be included in a range of 15 $cm^3$/g redox composition 101 to 40 $cm^3$/g of redox composition 101. For example, article 102 can reduce at least about 10 $cm^3$ of oxygen in the environment 100 per gram of redox composition 101 when the temperature of the environment 100 is no greater than 40° C.

The reduction of the oxygen in the environment 100 reduced by the article 102, 200 can occur within a period of time of days, weeks, or months. In fact, one advantage of the described redox compositions is that they are relatively long-acting compared to iron-based oxygen absorbers, and a small amount can continually scavenge oxygen over relatively long periods of time. For example, the article 102, 200 can reduce about 15 $cm^3$ of ground state oxygen in the environment 100 per g of redox composition 101 when the temperature of the environment 100 is no greater than about 30° C. in about 150 hours.

By using a carbohydrate material and relatively small amounts of non-toxic metals under acceptable levels to reduce oxygen in an environment, the articles 102, 200 can be used safely in applications where humans can come into contact with the articles 102, 200. The item 124 can be a food product in some instances, a pharmaceutical product in other instances, and a nutraceutical product in still other instances. Furthermore, by facilitating the reduction of oxygen in the environment 100 at room temperature or below, such as in refrigerated conditions, the article 102, 200 can be used in situations to minimize the degradation of the item 124 when the item 124 is stored at higher temperatures, typical to unrefrigerated transport during summer months, for example at about 50° C.

Figure 3:
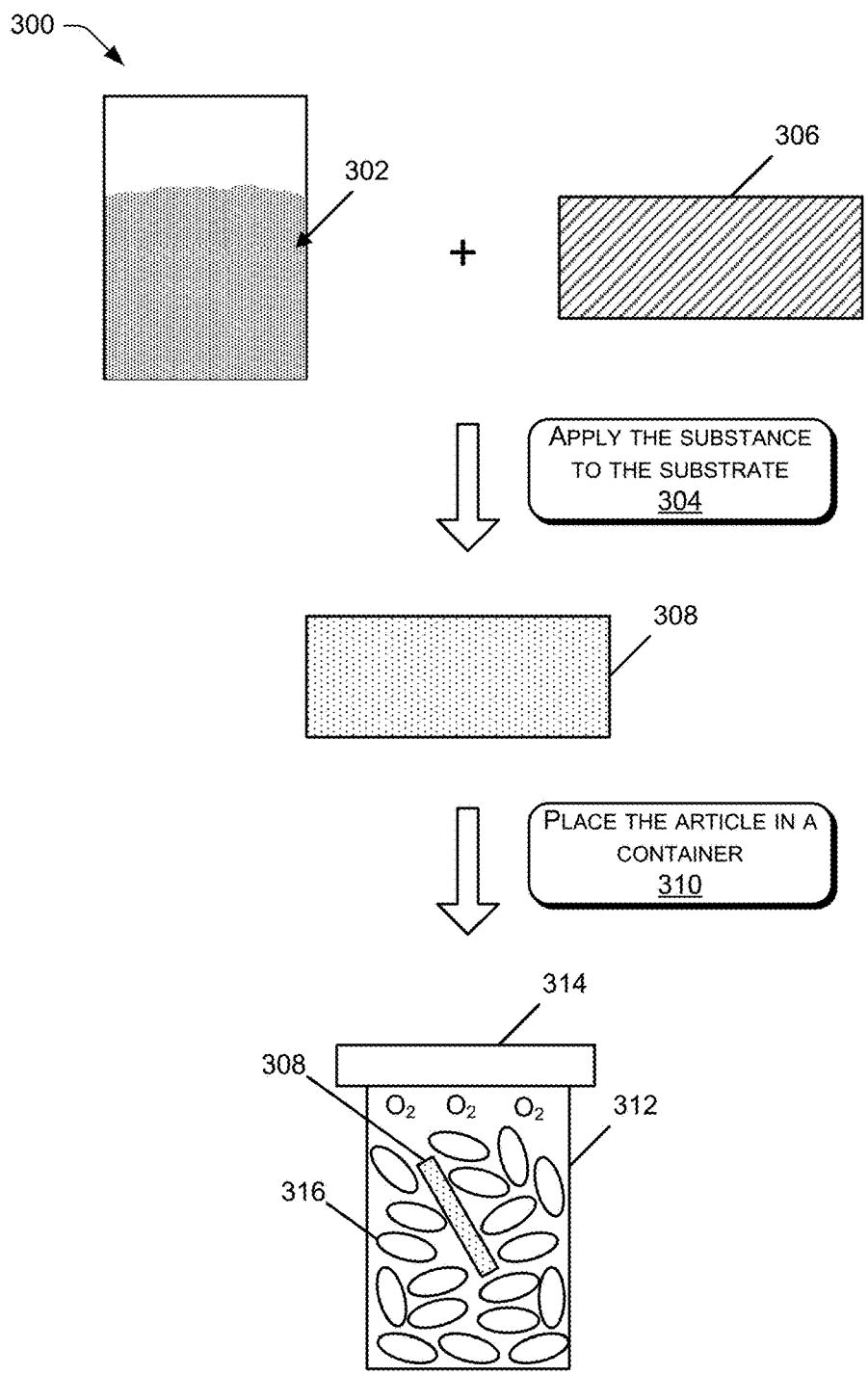
FIG. 3 illustrates a process to produce an article having a redox composition.

FIG. 3 illustrates a process 300 to produce an article including a carbohydrate material that reduces a substance in an environment. In an implementation, the process 300 can include providing a substance 302. In some cases, the substance 302 can include a solution. When the substance 302 is a solution, the substance 302 can include a carbohydrate material, an organic compound, such as an enediol, a phenol or a mixture thereof, one or more transition metals, and water. Additionally, the substance 302 can include other components in the solution. For example, the substance 302 can also include an imide. Further, in some implementations, the carbohydrate material can be absent from substance 302 (and the substance 302 may later be applied to a substrate or support containing the carbohydrate material). To illustrate, the substance 302 can include a solution having an enediol, one or more transition metals, and water.

The substance 302 can include a solution produced by combining any number of material components. In some cases, one or more solid components may be combined in water to produce the solution. For example, an amount of carbohydrate material can be combined with water such that the carbohydrate material is dissolved in the water. An amount of the organic compound, e.g., an enediol, and at least one transition metal may then be combined with the aqueous carbohydrate solution. In an implementation, the components may be mixed for a suitable duration, e.g., until the components are thoroughly mixed.

In additional implementations, the substance 302 can include a paste or a gel. For example, an amount of water, an amount of carbohydrate material, and an amount of transition metal can be combined to form a solution and another component, such as a thickening agent, can be added to the solution to form a paste. In an illustrative scenario, the substance 302 can include a paste that is formed from a powdered form of cellulose. The powdered form of cellulose can be a food grade form of cellulose.

Figure 8:
FIG. 8 includes color photographs of an article that changes color as oxygen in an environment is reduced by the article.
Figure 8:
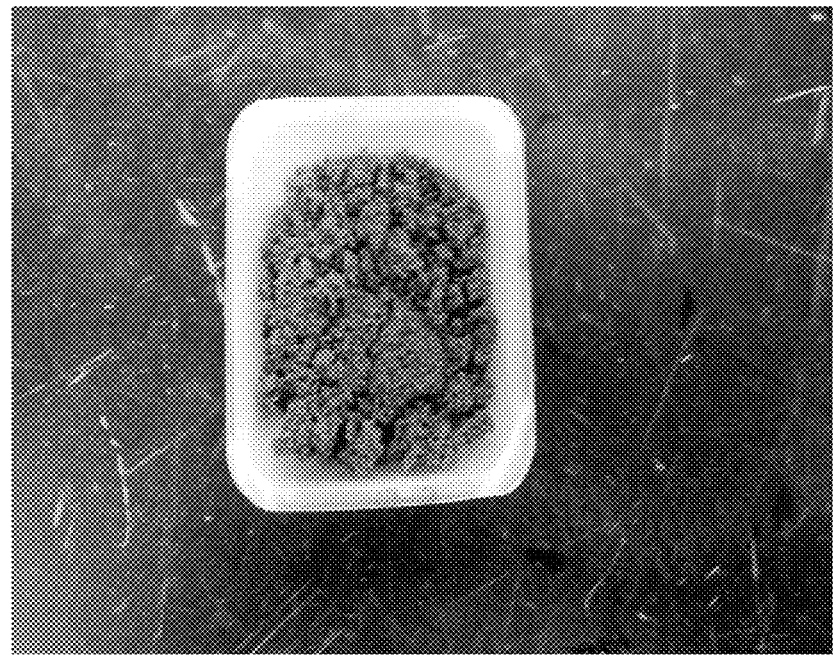
Figure 9:
FIG. 9 includes color photographs of articles that change color as oxygen in an environment is reduced by the articles.
Figure 9:
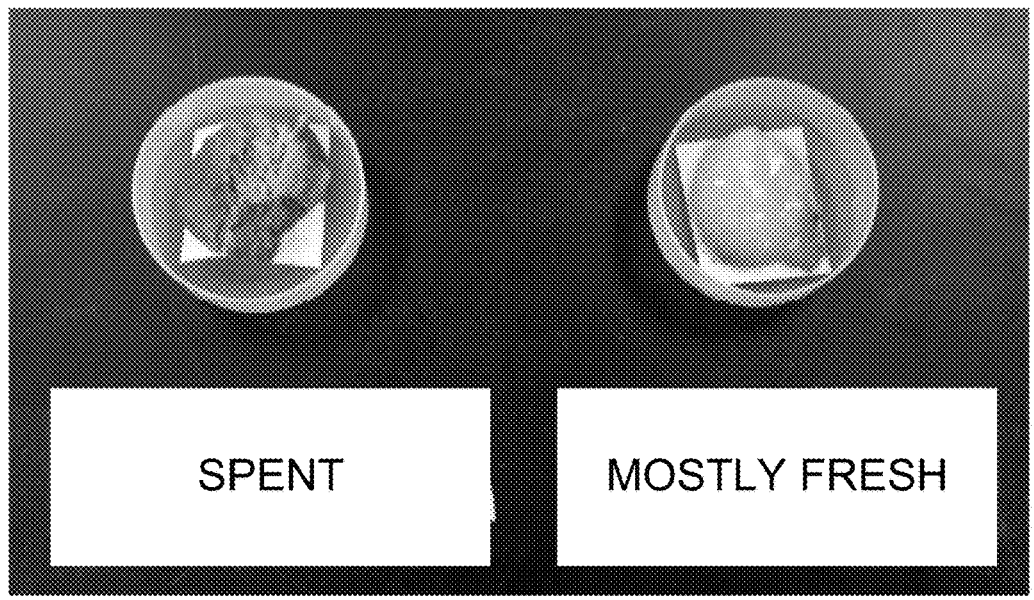
Figure 10:
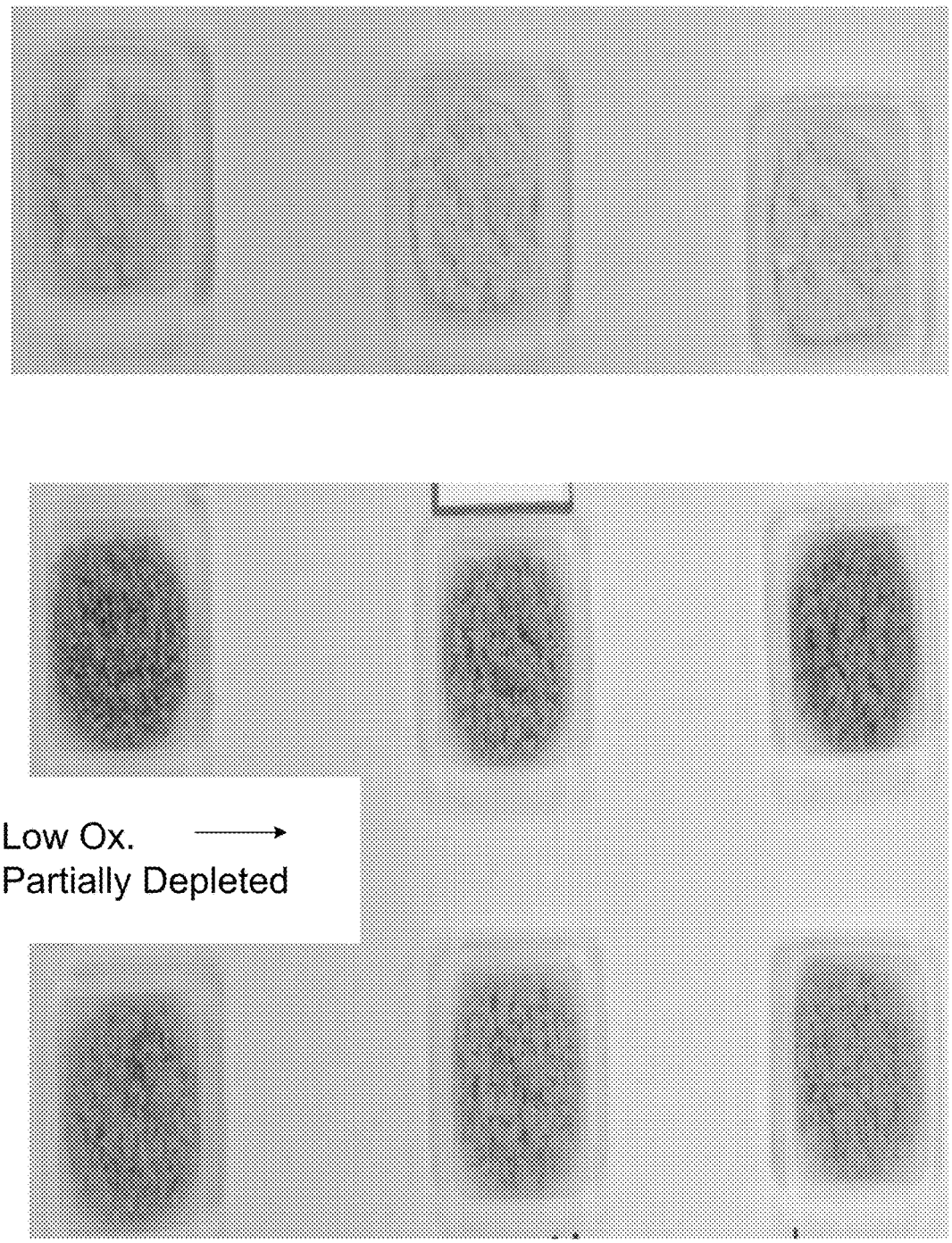
FIG. 10 includes color photographs of articles that change color as oxygen in an environment is reduced by the articles.

The substance 302 can also include a dye that provides a particular color for the substance 302. In some situations, the substance 302 can change color over time as the substance 302 reduces oxygen in an environment. For example, the substance 302 can change from a first color at a first time to a second color at a second time that is subsequent to the first time. The color change of substance 302 can signal when the oxygen scavenging article is exhausted or close to exhaustion—meaning that the article is no longer effective for reducing oxygen in an environment. The substance 302 can also include a dye that provides a particular color to the substance 302 that does not change in course of time or changes color minimally. Example color changes are illustrated in FIGS. 8-10.

The process 300 can also include providing a substrate 304 and, at 306, applying the substance 302 to the substrate 304 to produce an article 308 (which may be the article 102, 200). In one example situation, applying the substance 302 to the substrate 304 can include producing a coating or a film of the substance 302 on one or more surfaces of the substrate 306. The substance 302 may be applied to the substrate 306 using a printing, screen printing, or stencil printing process.

Additionally, the substance 302 can be applied to the substrate 304 by immersing the substrate 204 in a solution comprising the substance 302. In some situations, the substrate 304 can be immersed in the substance 302 when the substance 302 includes a solution that is free of carbohydrate material. In these cases, the substrate 304 can include a carbohydrate material. For example, the substrate 304 can include cellulose. In a particular example, the substrate 304 can include a paper product that is immersed in the substance 302.

Furthermore, the substrate 304 may comprise a carrier. For example, the substance 302 can be combined with or otherwise introduced to the silica gel as the carrier such that the substance 302 is adsorbed to the silica gel. In some examples, the silica gel can be combined with the substance 302, such as using a mixing process, and the substance 302 that includes the silica gel can then be applied to the substrate 304. That is, in some cases, the silica gel (or other carrier) acts as the substrate 304 such that the mixture of the silica gel and the substance 302 can be formed into the article 308. In other scenarios, the mixture of the silica gel and the substance 302 can be applied to the substrate 304 to form the article 308. For example, the mixture of the silica gel and the substance 302 can be applied to the substrate 304, such that the silica gel/substance 302 mixture forms a coating on one or more surfaces of the substrate 304. The substrate 304, in these cases, can include a plastic. In an illustrative implementation, the substrate 304 can include polyethylene.

Depending on the desired viscosity and the availability of processing aids, a number of silica gel/substance 302 mixtures with varying silica gel content can prove useful. In an implementation, the article 308 can include at least about 10% by weight silica gel, at least about 20% by weight silica gel, or at least about 30% by weight silica gel. In addition, the article 308 can include no more than about 75% by weight silica gel. In an illustrative example, the article 308 can include an amount of silica gel included in a range of about 5% by weight to about 80% by weight, about 25% by weight to about 60% by weight, or about 40% by weight to about 55% by weight.

In an implementation, the substrate 304 can be pretreated before the substance 302 is applied to the substrate 304. For example, the substrate 304 can be immersed in a pretreatment solution before the substance 302 is applied to the substrate 304. The pretreatment solution can include sodium carbonate ($Na_2CO_3$) in some cases. In other implementations, the pretreatment solution can include potassium hydroxide (KOH). For example, the substrate 304 can be immersed in a pretreatment solution for about 5 minutes to about 60 minutes. In another illustrative example, the substrate 304 can be immersed in a pretreatment solution for about 20 minutes to about 40 minutes.

In some cases, the article 308 can be dried after the substance 302 is applied to the substrate 304. In an implementation, the article 308 can be dried at a suitable temperature and duration by well-known methods in the art.

The substance 302 can have a water activity ($a_w$) of at least about 0.1, at least about 0.2, at least about 0.3, or at least about 0.4. In addition, the substance 302 can have a water activity of no greater than about 1, no greater than about 0.9, no greater than about 0.8, or no greater than about 0.7. In an illustrative example, the substance 302 can have a water activity included in a range of about 0.1 to about 0.5. Further, the article 308 can have a water activity included in a range of about 0.1 to about 0.6. In other implementations, the article 308 can have a water activity included in a range of about 0.2 to about 0.4.

The process 300 can include placing the article 308 into a container 312. The container 312 can include a lid 314 and an amount of oxygen. Additionally, the container 312 can include one or more items, such as an item 316. In some cases, the item 316 can include a food product, a pharmaceutical product, and/or a nutraceutical product, such as a dietary supplement.

The container 312 may be sized depending upon the application. For example, the internal volume may be sized dependent upon factors including the size and quantity of the article, as well as the size of the article 308. In an implementation, the container 312 can have a volume of at least about 1 $cm^3$, at least about 3 $cm^3$, at least about 6 $cm^3$, or at least about 10 $cm^3$. The container 312 can also have a volume of no greater than about 50 $cm^3$, no greater than about 40 $cm^3$, no greater than about 30 $cm^3$, or no greater than about 20 $cm^3$. In an illustrative example, the container 312 can have a volume included in a range of about 1 cm$^3$ to about 100 cm$^3$. In another illustrative example, the container 312 can have a volume included in a range of about 2 cm$^3$ to about 25 cm$^3$. In an additional illustrative example, the container 312 can have a volume included in a range of about 10 cm$^3$ to about 50 cm$^3$.

The article 308 can be placed in the container 312 to reduce oxygen in the container 312 in order to minimize oxidative degradation of the item 316. In an illustrative example, the article 308 can reduce at least about 8 cm$^3$ of ground state oxygen in the container 312 per gram of carbohydrate material included in article 308, at least about 15 cm$^3$ of ground state oxygen in the container 312 per gram of carbohydrate material included in the article 308, or at least about 30 cm$^3$ of ground state oxygen in the container 312 per gram of carbohydrate material included in the article 308. In another illustrative example, article 308 can reduce from about 15 cm$^3$ of ground state oxygen to about 60 cm$^3$ of oxygen in the container 312 per gram of carbohydrate material of article 308. In some cases, the article 308 can reduce an amount of ground state oxygen in the container 312 at a temperature in the container 312 no greater than about 60° C. in a period of time no greater than about 250 hours. In additional scenarios, the article 308 can reduce an amount of oxygen in the container 312 at a temperature in the container 312 included in a range of about 2° C. to about 50° C. in a period of time included in a range of about 10 hours to about 200 hours.

Figure 4:
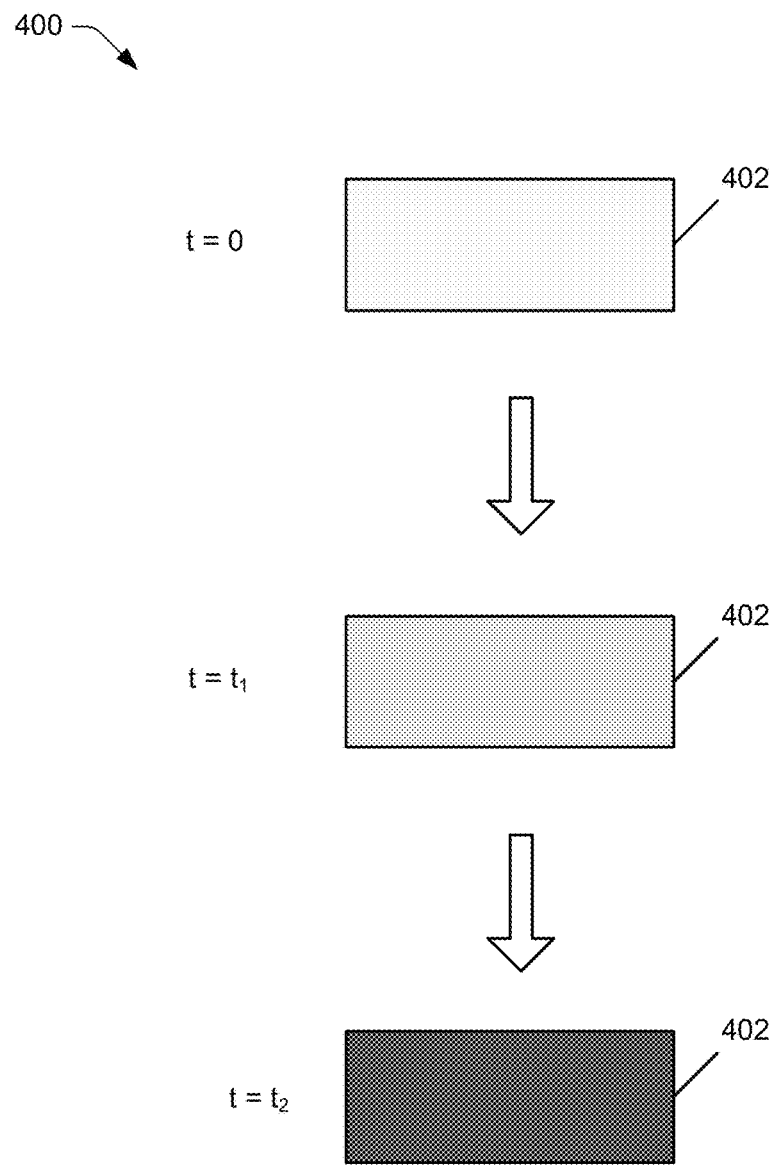
FIG. 4 illustrates a process by which an article including a dye changes color as the article reduces a compound of interest in an environment.

FIG. 4 illustrates a process 400 of making an article 402 including a dye, where the article 402 changes color as a carbohydrate material of the article 402 nears exhaustion, i.e., the capability of the carbohydrate material to serve as a reductant in the redox composition is significantly diminished. In some implementations, article 402 can be the article 102 of FIG. 1, the article 102 of FIG. 2, or the article 308 of FIG. 3. In the illustrative example of FIG. 4, the article 402 has a first color at time t=0. The first color of article 402 at t=0 can be produced by a dye included in article 402. In some cases, the dye can color one or more surfaces of the article 402. In some cases, the dye can color only a part of one or more surfaces of the article 402. In other situations, the dye can permeate the article 402. At time t=1, which is subsequent to t=0, the article 402 can change from the first color to a second color. The color change of the article 402 from t=0 to t=1 is an indicator that at least a portion of the carbohydrate material in article 402 is becoming oxidized as the compound of interest is reduced, which in this case is oxygen in an environment. Additionally, at time t=2, which is subsequent to t=1, the article 402 can change from the second color to a third color. Again, the color change of article 402 from t=1 to t=2 is an indicator that at least additional portions of the carbohydrate material in the article 402 are becoming oxidized.

In some cases, the color change of the article 402 can cease after a period of time. In an illustrative situation, the color change of the article 402 can cease when the carbohydrate material of the article 402 has reached or approached exhaustion as explained above. For example, the color change of article 402 can cease when the carbohydrate material of article 402 can no longer effectively function as a reductant in the redox composition, and thus, indicate when the article 402 can no longer effectively reduce a compound of interest, e.g., oxygen.

In an illustrative implementation, the article 402 can have a turquoise color at time t=0 and a red color at time t=2. In another illustrative implementations, the article 402 can have a white color at time t=0 and a brown color at time t=2. In still other implementations, the article 402 can have a yellow color at time t=0, an orange color at time t=1, and a brown orange color at time t=2. As stated, an observed color change in article 402 can indicate a time that the article 402 can be discarded or a time that the article 402 can be replaced.

Figure 5:
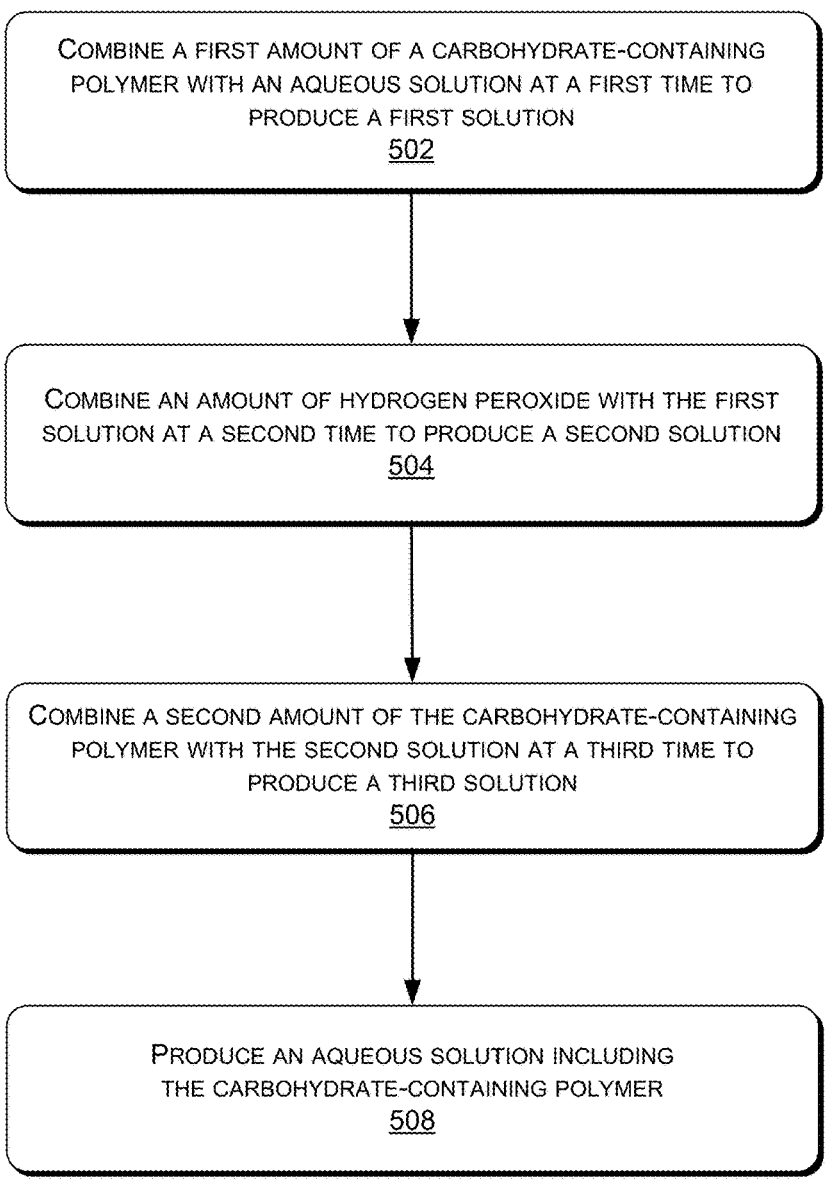
FIG. 5 illustrates a flow diagram of a process to produce a redox composition that includes a carbohydrate material hydrolyzed with hydrogen peroxide.

FIG. 5 illustrates a flow diagram of a process 500 to produce an aqueous solution of hydrolyzed carbohydrate polymer having a reduced number average molecular weight ($M_n$). In some cases, one or more of the operations of the process 500 can take place while heating the solution at a temperature of at least about 50° C., at least about 55° C., or at least about 60° C. Additionally, one or more of the operations of the process 500 can take place while heating the solution at a temperature no greater than about 85° C., no greater than about 80° C., no greater than about 75° C., or no greater than about 70° C. In an illustrative example, one or more of the operations of the process 500 can take place while heating the solution at a temperature included in a range of about 60° C. to about 80° C.

The process 500 includes, at 502, combining a first amount of a carbohydrate polymer with water to produce a first aqueous solution or aqueous suspension. For example purposes only, process 500 will describe the preparation of hydrolyzed carboxymethyl cellulose (CMC). The CMC is from a commercial source and typically has a $M_n$ of at least about 80,000 kDa. In an illustrative example, the number average molecular weight of the carbohydrate-containing polymer can be included in a range of about 80,000 kDa to about 250,000 kDa.

In some cases, the aqueous solution can include an amount of one or more transition metals. For example, the aqueous solution can include iron, copper, or both. In some implementations, the aqueous solution can include an inorganic salt of iron, an inorganic salt of copper, or both. In an illustrative example, the aqueous solution can include an amount of one or more transition metals included in a range of about 1 ppm to about 10,000 ppm. The person skilled in the art can understand that larger amounts of one or more transition metals can also produce desired results.

At 504, the process 500 includes combining an amount of hydrogen peroxide with the first solution to produce a second solution. The concentration of hydrogen peroxide included in the second solution can be in a range of about 0.1% by weight to about 5% by weight.

At 506, the process 500 includes combining a second amount of CMC with the second solution to produce a third solution. The second amount of CMC can be substantially the same or different than the first amount. The second amount of the CMC, like the first amount, can be a solid powder.

At 508, the process 500 includes producing an aqueous solution of hydrolyzed CMC. In some cases, it may be necessary to add more hydrogen peroxide to the solution at one or more intervals until a desired amount of hydrogen peroxide is added to the solution. In some implementations, an amount of an imide, e.g., N-hydroxy succinimide can be added to the aqueous solution of hydrolyzed CMC.

The hydrolyzed CMC will have a lower $M_n$ than the commercially sourced CMC. In an illustrative implementation, the $M_n$ of the hydrolyzed CMC produced by the process 400 can be included in a range estimated from about 10,000 kDa to about 100,000 kDa. In another illustrative implementation, the $M_n$ of hydrolyzed CMC can be estimated to be in a range of about 25,000 kDa to about 70,000 kDa. By reducing the $M_n$ of the CMC a more concentrated CMC solution can be produced because the hydrolyzed form has a greater solubility in water than the commercial source CMC. Therefore, a redox composition will contain relatively greater amounts of the CMC that is then used to reduce a compound of interest, and the resulting article will have a greater reducing capacity.

In an implementation, the aqueous solution of hydrolyzed CMC produced using the process 500 can be added to a solution containing an organic compound, e.g., an ascorbate, a phenol, or a mixture thereof. If the aqueous solution including the hydrolyzed CMC does not already include one or more transition metals, one can add a catalytic amount of one or more metals to the aqueous solution produced by the process 500. The solution can include a total amount of one or more metals included in a range of about 2 ppm to about 10,000 ppm. In an illustrative implementation, the solution can include an amount of a first metal included in a range of about 2 ppm to about 50 ppm. In another illustrative implementation, the solution can include an amount of a second metal included in a range of about 2 ppm to about 50 ppm.

In an example, the solution can include at least about 4% by weight of hydrolyzed CMC. In an illustrative example, the solution can include from about 4% by weight to about 50% by weight of hydrolyzed CMC. In another illustrative implementation, the solution can include from about 8% by weight to about 30% by weight of hydrolyzed CMC. However, one can also choose to include hydrolyzed CMC at a % weight outside of these ranges.

Additionally, the solution can include an amount of an organic compound, such as at least about 0.5% by weight. In an illustrative implementation, the solution can include from about 0.5% by weight to about 30% by weight of an organic compound. In another illustrative example, the solution can include from about 1% by weight to about 10% by weight of an organic compound. However, one can also choose to include the organic compound at a % weight outside of these ranges. A person of skill understands that the concentration of organic compound in an aqueous-based solution could be limited by the solubility of the organic compound in water. In such instances, it may be necessary to add small amounts of a lower alcohol or polyol to the solution to achieve the higher concentrations of organic compound.

In addition, the solution can include an amount of a dye, such as at least 1 ppm of dye. In a particular illustrative example, the solution can include from about 1 ppm to about 50 ppm of dye.

Figure 6:
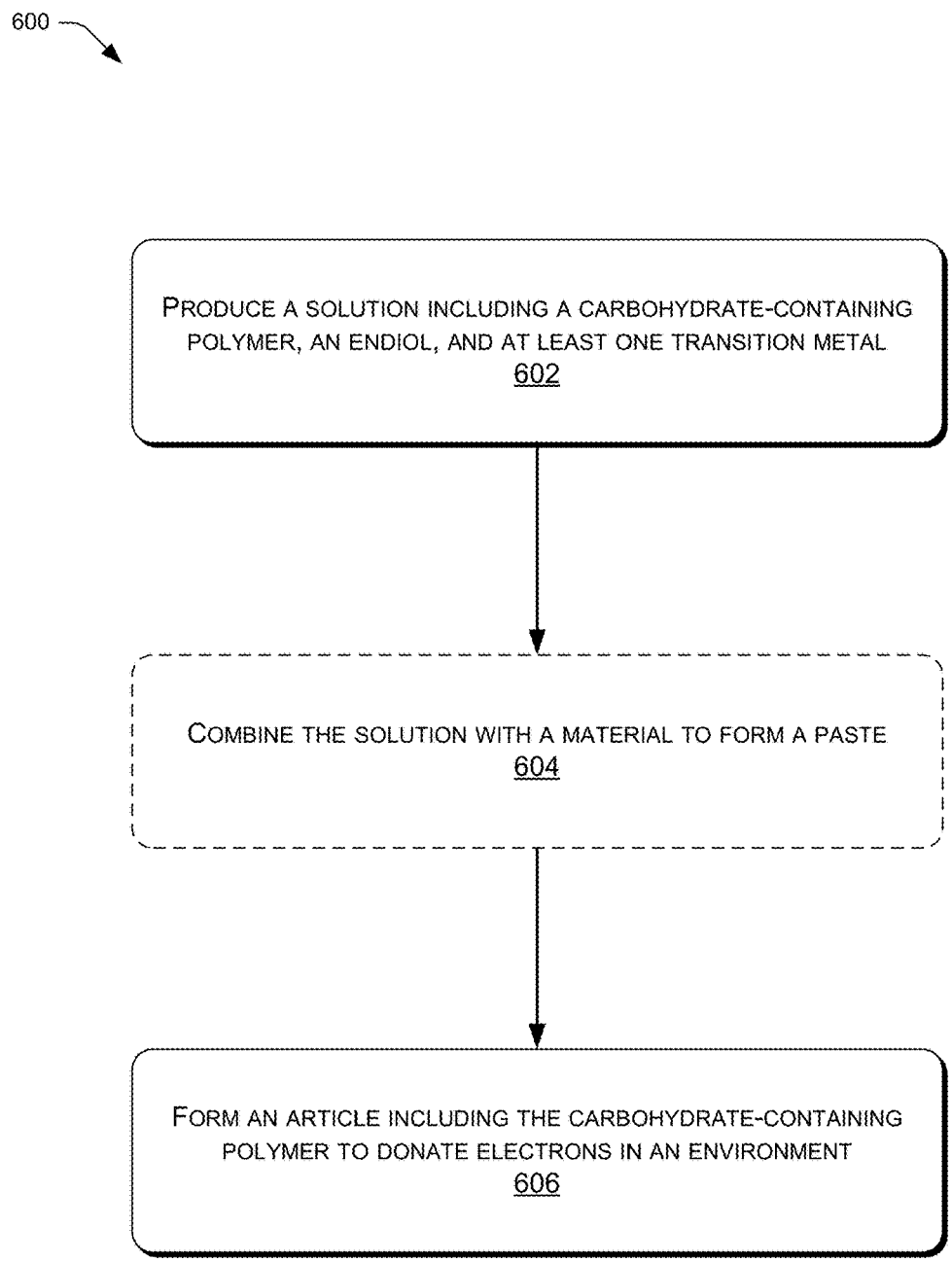
FIG. 6 illustrates a flow diagram of a process to form an article that includes a carbohydrate material.

FIG. 6 illustrates a flow diagram of a process 600 to form an article including a carbohydrate-containing polymer that donates electrons in an environment. At 602, the process 600 includes producing a solution including a carbohydrate material, an enediol, and at least one transition metal. In some cases, the solution can be produced by combining one or more precursor solutions. The solution can also be produced by combining one or more solid materials with one or more precursor solutions.

In an implementation, an amount of water can be heated at a temperature included in a range of about 50° C. to about 90° C. and an amount of a carbohydrate-containing polymer can be added to the water while stirring for an amount of time. In some cases, the carbohydrate-containing polymer can be added in the form of a solid, such as a powder. In an example, the mixture can be stirred for between about 1 minute and about 30 minutes. In another example, the mixture can be stirred for about 2 minutes to about 10 minutes. Upon the amount of the carbohydrate material being dissolved in the water, the mixture can be cooled and an amount of an enediol or other organic compound can be added to the mixture. In some scenarios, the mixture can be cooled to a temperature from about 15° C. to about 30° C. Furthermore, an amount of one or more transition metals can also be added to the mixture. The amount of the one or more transition metals can be added to the mixture as dilute aqueous solutions including the one or more transition metals.

In an alternative implementation, the aqueous solution including the carbohydrate-containing material produced using the process 500 described previously with respect to FIG. 5 can be mixed with an amount of an enediol. If the aqueous solution including the carbohydrate material produced using the process 500 does not already include one or more transition metals, the process 600 can include adding an amount of one or more transition metals to the aqueous solution produced by the process 500. Additionally, a further amount of one or more transition metals can be added as desired during the process 600.

In an implementation, the solution can include an amount of carbohydrate material of at least about 4% by weight for a total weight of the solution. In an illustrative example, the solution can include an amount of the carbohydrate material included in a range of about 4% by weight for a total weight of the solution to about 50% by weight. In another illustrative implementation, the solution can include an amount of the carbohydrate material included in a range of about 8% by weight for a total weight of the solution to about 30% by weight.

Additionally, the solution can include an amount of an organic compound, for example an enediol or a phenol such as at least about 0.5% by weight. In an illustrative implementation, the solution can include an amount of an enediol included in a range of about 0.5% by weight of the total weight of the solution to about 30% by weight of the total weight of the solution. In another illustrative example, the solution can include an amount of an enediol included in a range of about 1% by weight of the total weight of the solution to about 10% by weight of the total weight of the solution.

Further, the solution can include a total amount of one or more transition metals included in a range of about 2 ppm to about 100 ppm. In an illustrative implementation, the solution can include an amount of a first transition metal included in a range of about 2 ppm to about 25 ppm. In another illustrative implementation, the solution can include an amount of a second transition metal included in a range of about 2 ppm to about 25 ppm.

The solution can also include at least about 40% by weight water. In an illustrative implementation, the solution can include from about 50% to about 80% by weight of water. In addition, the solution can include an amount of a dye, such as at least 1 ppm of dye. In a particular illustrative example, the solution can include an amount of dye included in a range of about 1 ppm to about 8 ppm. However, one can implement an amount of dye in excess of 8 ppm as well.

The process 600 can optionally include, at 604, combining the solution obtained by the process 500 with a material to form a paste. In some cases, the material can include a cellulose-containing material. In a particular illustrative example, the material can include a food grade cellulose-containing material. In other cases, the material can include a silica gel. Additionally, the process 600 includes, at 606, forming an article including the carbohydrate material to reduce a compound of interest in an environment. In an implementation, the article can be formed by applying the solution produced at 602 to an article substrate. For example, the solution can be coated onto one or more surfaces of an article substrate to form the article. In an illustrative implementation, the solution can be printed on one or more surfaces of an article substrate to form the article. In another example, the article substrate can be immersed in the solution produced at 602 to form the article. In an additional example, the solution produced at 602 can be injected into the article substrate to form the article. In some situations, the substrate can include a plastic, such as polyethylene. In other instances, the substrate can include a cellulose-based substrate, such as a paper product. In implementations, where the paste is formed at 604, the article can be formed by applying the paste to one or more surfaces of an article substrate. In a particular implementation, after applying the solution or the paste to the article substrate, the article can undergo a drying operation before being placed in an environment.

In an implementation, the article produced by the process 500 can reduce a compound of interest in an environment. In some cases, the article can reduce a compound of interest in an environment at a temperature no greater than about 50° C. In a particular implementation, the article can reduce oxygen in the environment. In some situations, the article can reduce at least about 8 $cm^3$ of ground state oxygen in the environment at a temperature included in a range of about 2° C. to about 50° C. in a period of time no greater than about 250 hours.

FIG. 7 illustrates a flow diagram of a process 700 to produce an aqueous solution including an organic compound, e.g., an enediol or a phenol, and to apply the aqueous solution to a carbohydrate material, e.g., a cardboard, a paper pulp, a cotton duck cloth, a cotton roll or the like. At 702, the process 700 includes producing an aqueous solution, or a mixed aqueous/alcohol solution, including the organic compound. In some instances, the aqueous solution can also include one or more metals. Further, the aqueous solution can also include other components, such as an imide.

At 704, the process 700 includes applying the aqueous solution to a substrate including cellulose. In an implementation, applying the aqueous solution to the substrate can include immersing the substrate in the aqueous solution. In other cases, applying the aqueous solution to the substrate can include injecting or spraying the substrate with the solution. In the implementations of the process 700, an article including a carbohydrate-containing polymer can be produced without producing a solution that includes the carbohydrate-containing polymer. Instead, a solution is prepared that is free of the carbohydrate-containing polymer, and the substrate itself provides the carbohydrate-containing polymer to donate electrons in an environment. In the implementations of the process 700, an article excluding a carbohydrate-containing polymer can be produced with a solution that includes a carbohydrate-containing material or a mixture of multiple carbohydrate-containing materials.

An exemplary article comprises: a first portion disposed on a second portion. The first portion will have no greater than about 30% by weight of an organic compound selected from an enediol or a phenol or a mixture thereof. The second portion includes a catalytic amount of a transition metal, and at least about 10% by weight of a carbohydrate material.

In many implementations, the carbohydrate material is a cellulose material having predominantly β-linkages, for example, the cellulose material may be carboxymethyl cellulose or hydrolyzed carboxymethyl cellulose. In other implementations, the carbohydrate material or cellulose material will have a number average molecular weight of no greater than about 100,000. In still other implementations, the transition metal catalyst includes iron or copper, and the enediol includes ascorbic acid.

An application of interest for such an article is to reduce oxygen in an environment at a temperature no greater than about 60° C. For example, the article can reduce about 15 $cm^3$ of ground state oxygen to about 60 $cm^3$ of oxygen per gram of the carbohydrate material present in the article. In many instances, and depending upon the industrial use of the article, the above stated reduction of oxygen can occur in a period of time no greater than about 100 hours.

Another application of the described article can be to reduce any compound of interest, e.g., toxic or odorous compounds, or an industrial waste gas. The process used to reduce a compound of interest includes providing a redox composition that includes a carbohydrate material and an organic compound that is present in a catalytic molar amount in catalytic relationship with the carbohydrate material. The redox composition can also include a transition metal, which also is present in a catalytic molar amount. The redox composition is used as a source of electrons, and when the composition comes in contact with a compound of interest, the electrons are used to reduce the compound. The reduction of the compound can occur in an environment at a temperature of no greater than about 50° C. In many instances, the environment is a closed environment, e.g., a product enclosure, and has a relative humidity of at least about 2%. The article and the described process can be used to reduce about 10 $cm^3$ to about 60 $cm^3$ of ground state oxygen in the environment per gram of the carbohydrate material in the redox composition.

In an implementation, an article can be prepared as follows. Prepare an aqueous solution that includes an organic compound, e.g., an enediol and/or a phenol. Depending upon the water solubility of the organic compound add a small amount of a lower alcohol, e.g., ethanol, or a polyol, e.g. polypropylene glycol, glycerol to the solution. The need to add the alcohol is rarely necessary as the molar concentration of organic compound in the article, and in particular, the redox composition is low. Again, it is believed that the organic compound plays a catalytic role in facilitating a transfer of electrons from the carbohydrate material in the redox composition to the compound of interest with the aid of the transition metal if present. Other components are optionally added to the solution including additional transition metal or an N-hydroxyl imide, e.g., N-hydroxy succinimide, or a mixture of the two. The carbohydrate material is then added to the solution to form a thickened paste or semi-wet solid. The wetted carbohydrate material is then dried. Alternatively, the semi-wet solid can be positioned on any of the described supports, such as paper pulp, cotton, silica, clays and the like, and then dried. In some instances, the above described aqueous solution is prepared by combining at least 10 parts by weight of a carbohydrate material based upon a total weight of solid components present in the solution; at least 1 part of an enediol or a phenol for the total weight of the solution; at least 2 ppm of a metal. In one aspect, the carbohydrate material is carboxymethyl cellulose or a hydrolyzed carboxymethyl cellulose, the enediol includes ascorbic acid, and the transition metal includes copper or iron, or a mixture of the two metals.

In one aspect, the average number molecular weight of the carboxymethyl cellulose is no greater than about 80,000, and in many instances, the average number molecular weight is no greater than about 40,000, and in still other instances, the average number molecular weight is no greater than about 20,000.

EXAMPLES

Preparation of Hydrolyzed Carboxymethyl Cellulose 500 mL of water to which was added $Cu(SO_4)$, $Cu^{2+}$ (2 ppm), was heated to 70° C., and was maintained near or at 70° C. for the process described. Carboxymethyl cellulose (CMC) was added to the heated water in 100 g portions at time intervals in accordance with the Table of Additions below. A total of 500 g (5×100 g) of CMC was added. Hydrogen peroxide (3%) was also added to the heated water in accordance with the Table of Additions. A total of 500 mL (5×100 mL) of the 3% $H_2O_2$ was added. Additional water was added (100 mL) at 150 min from the first added portion of CMC. A viscous light yellow liquid was produced that contains 31.3% by weight of hydrolyzed CMC.

Table of Additions

| Time (min) | CMC (g) | $H_2O_2$ (mL) |
|---|---|---|
| 0 | 100 | — |
| 10 | — | 100 |
| 20 | 100 | — |
| 25 | — | 100 |
| 50 | 100 | — |
| 60 | — | 100 |
| 70 | — | 100 |
| 90 | 100 | — |
| 120 | 100 | — |
| 140 | — | 100 |

Examples 1 and 2

Examples 1 and 2 were prepared as follows. In accordance with the amounts listed in Table 1, $KHCO_3$ was added to the viscous hydrolyzed CMC (hCMC) solution, followed by a slow addition of ascorbic acid (AA). To this solution was added a solution of $KHSO_4$, the gram amount of $KHSO_4$ and volume of solution added is indicated in Table 1. Lastly, small amounts of an aqueous solution containing $Cu(SO_4)$ and $Fe(SO_4)$ were added to each Example solution composition to provide approximately 0.01 g $Cu(SO_4)$ and 0.01 g Fe(SO4). Upon the addition of the metal solution, the solutions are immediately stored in an air tight container until further use.

TABLE 1

| Ex. | CMC (g) | $KHCO_3$ (g) | $KHSO_4$/water (g)/(g) | AA (g) | AA wt. % |
|---|---|---|---|---|---|
| 1 | 24 | 0.9 | 1.23/3 | 7.04 | 19.2 |
| 2 | 24 | 0.12 | 0.164/0.4 | 0.938 | 3.39 |

Examples 3 and 4

Example 1 was used in the preparation of Example 3. Example 2 was used in the preparation of Example 4. Example 1, 10 g, and Example 2, 10 g, are each and separately supported on 3.6 g of Solka Floc 300FCC. Supported Example 3 and Supported Example 4 are placed in an $O_2$ scavenger apparatus as described below. The oxygen scavenging performance of each Example composition is shown in Table 2. The initial $O_2$ concentration in the apparatus volume was 22.5% with the balance being nitrogen. The apparatus consisted of a barrier pouch, 8"×16" in dimension inside of which Example 3 & Example 4 were placed. The pouch was filled with 1000 cc of gas mixture using Aalborg® digital mass flow controller (model DFC26). The drop in oxygen concentration over a period of time was measured using Mocon PAC CHECK™ dual headspace analyzer (model 650). Persons skilled in the art will understand that one molecule of Ascorbic Acid can donate two electrons in a redox reaction originating from its enolic site. The same person also understands that one molecule of diatomic oxygen will require four electrons in order to completely undergo reduction. This redox equivalency between Ascorbic Acid and diatomic oxygen requires that 2 molar equivalents of Ascorbic Acid will need to have donated four electrons from its enolic sites in order to reduce 1 molar equivalent of diatomic oxygen. The inter-activity relationship between Ascorbic Acid and diatomic oxygen is thus 2 moles of Ascorbic Acid to 1 mole of diatomic oxygen or 1 mole of Ascorbic Acid to 1 atom of Oxygen.

TABLE 2

| | % O2 measured (cc of O2 scavenged at STP) | | | | | | | | |
|---|---|---|---|---|---|---|---|---|---|
| time (hr) | 3 | 18 | 27 | 90 | 114 | 141 | 168 | 191 | 336 |
| 3 | 22.2 (7.7) | 21.8 (16.9) | 21.5 (25.2) | 20.4 (51.3) | 19.8 (66.3) | 19.5 (72.8) | 18.5 (96.9) | 18.4 (99.3) | 16.9 (133.6) |
| 4 | 22.2 (7.7) | 21.6 (20.7) | 21.3 (28.2) | 20.3 (55.2) | 19.6 (71.1) | 19.4 (75.7) | 18.4 (99.3) | 18.4 (99.3) | 17.7 (115.4) |

Example 3 and Example 4 contain approximately 16.66 mmol and 2.22 mmol of ascorbic acid respectively in the redox composition. The amount of oxygen ($O_2$) scavenged after seven days (168 hours) are approximately 5.48 matom and 4.70 matom respectively in Examples 3 and 4.

Examples 5 to 7

Example 2 was used in the preparation of Examples 5 to 7. Example 5 was prepared by adding 5 g of Example 2 and 3 g water to 8 g of silica gel A type. Example 6 was prepared by adding 5 g of Example 2 and 3 g of water to 8 g of silica gel B type. Example 7 was prepared by adding 5 g of Example 2 and 3 g of water to 8 g of diatomaceous earth. Supported Examples 5 to 7 are placed in an $O_2$ scavenger apparatus as described. The oxygen scavenging ability of each supported Example composition is provided in Table 3. The initial $O_2$ concentration in the apparatus volume was 22.5%.

TABLE 3

| | % O2 measured (cc of O2 scavenged at STP) | | | | | | | | |
|---|---|---|---|---|---|---|---|---|---|
| time (hr) | 3 | 18 | 27 | 90 | 114 | 141 | 168 | 191 | 336 |
| 5 | 21.9 | 20.6 | 20.1 | 18.1 | 17.2 | 16.9 | 15.6 | 15.4 | 13.8 |
|   | (14.3) | (45.6) | (59.8) | (106) | (127) | (134) | (162) | (167) | (201) |
| 6 | 20.8 | 18.9 | 18.4 | 17.1 | 16.5 | 16.1 | 15.0 | 14.8 | 13.4 |
|   | (42.9) | (87.8) | (98.6) | (129) | (142) | (151) | (175) | (180) | (209) |
| 7 | 20.5 | 18.9 | 18.5 | 17.2 | 16.6 | 16.3 | 15.2 | 15.2 | 14.1 |
|   | (48.3) | (86.6) | (97.2) | (128) | (141) | (147) | (171) | (171) | (194) |

Examples 5 to 7 each contain approximately 0.96 mmol of ascorbic acid in the redox composition. The amount of oxygen ($O_2$) scavenged after seven days (168 hours) is approximately the same in each, that is, about 16 matom.

Example 8

In Example 8, two preparations were tested and their weight change as a result of oxygen uptake over a period of time was determined. The first preparation was in liquid form weighing 50 g and is referred to as 'CMC/ascorbic acid system.' The first preparation contained sodium salt of carboxymethyl cellulose (10.7 wt %), ascorbic acid (10.1 wt %), potassium bicarbonate (1.3 wt %), potassium bisulfate (1.8 wt %), copper (II) sulfate (0.1 wt %), Fe (II) sulfate (0.1 wt %) and water (75.9 wt %). The second preparation is referred to as 'ascorbic acid (alone) system'. The second preparation was also in liquid form weighing 50 g, and contained ascorbic acid (10.1 wt %), potassium bicarbonate (1.3 wt %), potassium bisulfate (1.8 wt %), copper (II) sulfate (0.1 wt %), Fe (II) sulfate (0.1 wt %) and water (86.6 wt %).

Figure 11:
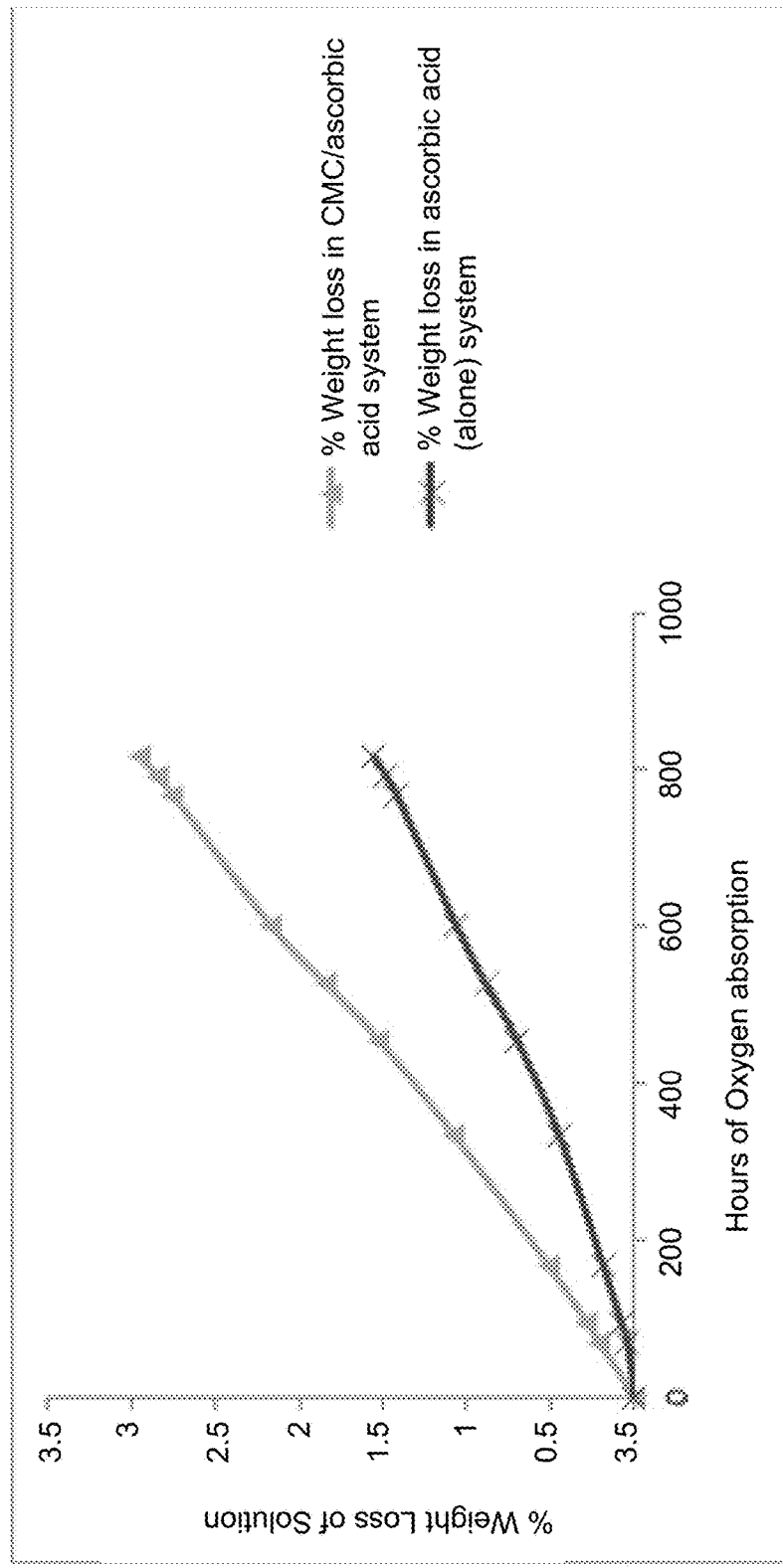
FIG. 11 is a graph illustrating efficacy of redox compositions according to embodiments of this disclosure.

Each of the formulations was stored at room temperature in a tightly closed plastic container of approximately 500 cc capacity. Prior to each weighing, both containers were placed for 30 minutes in a refrigerator maintained at 3-4 deg. C. Upon weighing cold, the lid on either container was removed for 30 seconds to help equilibrate the air above the scavenging liquid. The lid was then closed and solution stored away at room temperature until the next weighing. FIG. 11 is a graph indicating that the embodiment 'CMC/ascorbic acid system' differed significantly in the weight change compared to the embodiment 'ascorbic acid (alone) system'.

Example 9

Figure 12:
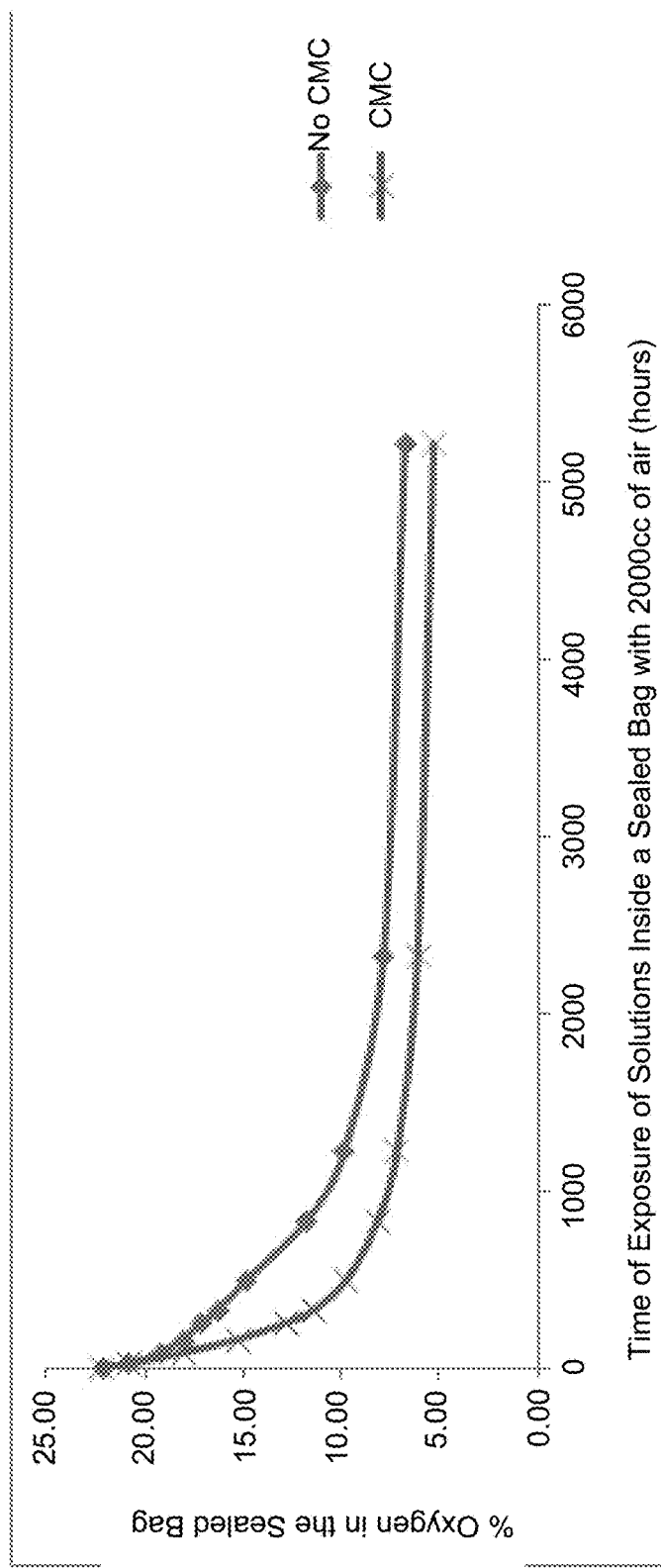
FIG. 12 is a graph illustrating efficacy of redox compositions according to embodiments of this disclosure.

In Example 9, oxygen absorption of the two liquid formulations of Example 8 were tested in a sealed bag filled with 2000 cc of air. 25 g of each of the formulations was placed in the bag, and stored at room temperature throughout the study. FIG. 12 indicates that the oxygen absorption differed significantly for the two formulations.

FIGS. 11 and 12 suggest that the CMC/ascorbic acid system shows a faster reduction upon introduction of the system to the environment, and both systems proceed at generally the same rate. One theory for the initial heightened reduction is that during an initial phase, the organic compound (ascorbic acid) may be in close contact with the carbohydrate material (CMC) and thus catalyze oxidation of the CMC in its immediate vicinity, whereas the relatively large amount of CMC is not contacted everywhere by the ascorbic acid. Increasing the amount of the ascorbic acid could achieve catalyzation of oxidation of even more of the CMC. Moreover, the addition of more ascorbic acid after some amount of time would be expected to catalyze oxidation of more of the CMC.

Examples 10-12

Table 4 sets forth three formulations used in Examples 10, 11 and 12. Specifically, the formulations include hydroquinone (as the organic compound at 1.0%wt), acetoin (as the organic compound at 1.0%wt), and catechol (as the organic compound at 1.0%wt), respectively.

TABLE 4

Formulations for Examples 10-12.

| Ex. | CMC (g) | KHCO$_3$ (g) | KHSO$_4$ (g) | Water (g) | Organic Compound | Organic Compound % wt |
|---|---|---|---|---|---|---|
| 10 | 10.72 | 0.13 | 0.18 | 87.11 | Hydroquinone | 1.0 |
| 11 | 10.72 | 0.13 | 0.18 | 87.11 | Acetoin | 1.0 |
| 12 | 10.72 | 0.13 | 0.18 | 87.11 | Catechol | 1.0 |

As shown, each includes CMC (as a carbohydrate material), $KHCO_3$, $KHSO_4$, water, and the organic compound. Hydroquinone and catechol are phenols, whereas acetoin is an alpha-hydroxy ketone.

In experiments using the formulations of Table 4, each of the formulations was placed inside a barrier bag and % oxygen readings were measured inside the bag at various time intervals, starting from an initial value of 22.5. The results of these experiments are set forth in Table 5:

TABLE 5

| | % O$_2$ measured at STP | | | | | | | | | |
|---|---|---|---|---|---|---|---|---|---|---|
| time (hr) | 0 | 20 | 86 | 158 | 254 | 326 | 494 | 830 | 1221 | 2325 |
| 10 | 22.50 | 22.30 | 22.30 | 21.90 | 21.90 | 22.00 | 21.80 | 21.50 | 21.10 | 20.50 |
| 11 | 22.50 | 22.30 | 22.30 | 22.10 | 21.90 | 21.80 | 21.60 | 21.60 | 21.40 | 20.90 |
| 12 | 22.50 | 22.30 | 22.20 | 21.90 | 21.70 | 21.60 | 21.30 | 21.20 | 20.60 | 19.90 |

Figure 13:
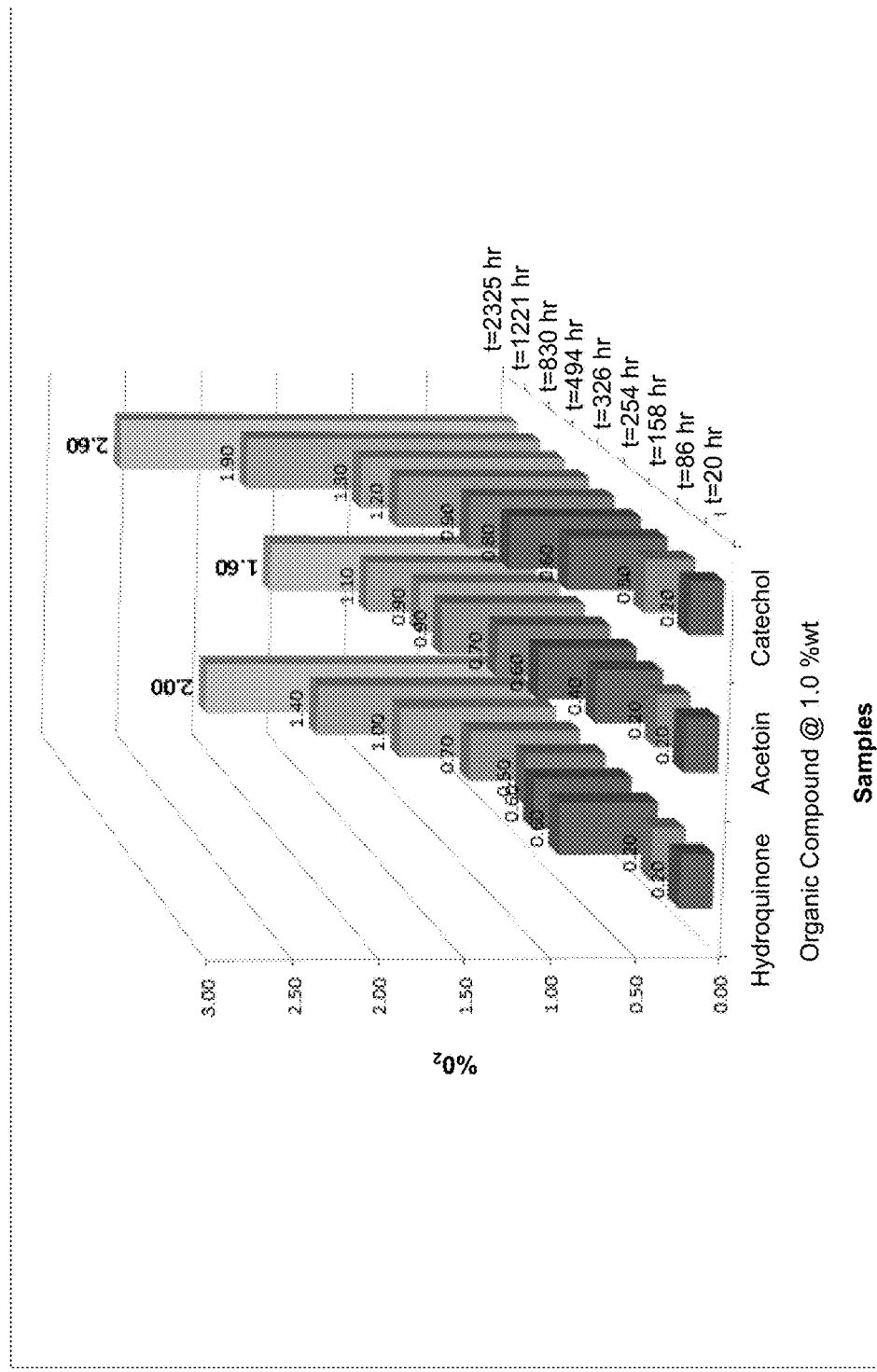
FIG. 13 is a graph illustrating efficacy of redox compositions according to embodiments of this disclosure.

FIG. 13 is a bar graph representing the oxygen absorption data set forth in Table 5. Table 5 and FIG. 13 demonstrate the role of organic compounds employed in examples 10, 11 and 12 in the catalytic oxygen scavenging formulations according to this disclosure.

While the invention has been described in connection with certain presently preferred embodiments thereof, those skilled in the art will recognize that many modifications and changes may be made therein without departing from the true spirit and scope of the invention which accordingly is intended to be defined solely by the appended claims.

We claim:

1. A redox composition for reducing a compound of interest, comprising:
   a carbohydrate material; and
   a catalytic molar amount of an organic compound in a mobile phase and in catalytic relationship with the carbohydrate material to promote oxidation of the carbohydrate material, the organic compound having at least one carbon-carbon double bond and at least one hydroxyl group.

2. The redox composition of claim 1 wherein the carbohydrate material and the organic compound are present in the redox composition at a weight ratio of carbohydrate material:organic compound in a range of 1:1 to 200:1.

3. The redox composition of claim 1 wherein the organic compound is a phenol and comprises resorcinol, pyrogallol, pyrocatechol monoethyl ether, resorcinol monoethyl ether, hydroquinone, catechol, 1,2,4-trihydroxy benzene, tetrahydroxy-1,4-benzoquinone, 2,4-dibutylphenol in free form or in the form of an alkali or alkaline earth metal salt, or 2,6-dibutylphenol in free form or in the form of an alkali or alkaline earth metal salt.

4. The redox composition of claim 1, wherein the organic compound is an enediol and comprises ascorbic acid, ascorbates in either D- or L- form, ascorbate stereoisomers, ascorbate diastereomers, an alpha-hydroxy ketone, ascorbate salts, squaric acids, dihydroxymaleic acids, rhodizonic acids, vicinal diols including 1, 2-diols, vicinal diketones, or dihydroxyfumaric acids.

5. The redox composition of claim 1, wherein the carbohydrate material has a cellulose content that exceeds 50% by weight.

6. The redox composition of claim 1, wherein the carbohydrate material is a cellulose that has been pre-conditioned to provide for a shortening of the polysaccharide chain and has a number average molecular weight of less than 50,000.

7. The redox composition of claim 1, further comprising a catalytic molar amount of metal in catalytic relationship with the organic compound to promote oxidation of the organic compound.

8. The redox composition of claim 7, wherein the metal is present at a concentration from 1 ppm to 10000 ppm and comprises at least one of scandium, titanium, vanadium, chromium, manganese, iron, cobalt, nickel, copper, zinc, and organic complexes of the foregoing.

9. The redox composition of claim 1, wherein the composition oxidizes the carbohydrate material at a temperature below about 50° C.

10. The redox composition of claim 1, wherein the compound of interest is oxygen and the redox composition reduces a minimum of 10 cm$^3$ of oxygen per gram of the redox composition at 23° C. in less than 100 hours.

11. The redox composition of claim 1, wherein the carbohydrate material comprises at least one of wood pulp, cotton, cellulose, cotton duck cloth, cotton roll, paperboard, cardboard, and paper and the organic compound is carried on the carbohydrate material.

12. An article comprising:
   a carrier comprising plastic, silica, diatomaceous earth, activated carbon, zeolites, metal oxides of silicon, aluminum or calcium, metal hydroxides of silicon, aluminum, and calcium, metal carbonates of calcium, metal carbonates of magnesium, montmorillonite, kaolite, attapulgite, sepiolite, talc, vermiculite, precipitated metal silicates, alumina silica gels, aluminum phosphate, or clays; and
   the redox composition of claim 1 disposed on the carrier.

13. The article of claim 12, further comprising a support supporting the carrier carrying the redox composition, wherein the support comprises wood pulp, cotton, cellulose, cotton duck cloth, cotton roll, paperboard, cardboard, or paper.

14. An article comprising:
   a support comprising a substrate or a sachet;
   the redox composition of claim 1 disposed on the support; and
   a moisture impermeable barrier disposed over the redox composition, wherein the moisture impermeable barrier is permeable to the compound of interest.

15. A package comprising:
   at least one sidewall defining an enclosed interior space with an interior environment having an interior temperature and relative humidity; and
   an article disposed in the enclosed interior space to remove oxygen from the interior space, the article comprising a redox composition comprising a carbohydrate material incapable of oxidizing the compound of interest at the interior temperature and relative humidity absent a catalyst and a catalytic molar amount of an organic compound having at least one carbon-carbon double bond and at least one hydroxyl group in a mobile phase and in catalytic relationship with the carbohydrate material, wherein the organic compound catalyzes the reduction of the oxygen by the carbohydrate material at the interior temperature and relative humidity.

16. The package of claim 15, wherein the organic compound is an enediol, a phenol, or a mixture.

17. The package of claim 15, wherein the redox composition further comprises a catalytic molar amount of metal to catalyze oxidation of the organic compound.

18. An article comprising:
   a redox composition comprising a carbohydrate material incapable of reducing oxygen in an environment having a temperature and relative humidity absent a catalyst and a catalytic molar amount of an organic compound having at least one carbon-carbon double bond and at least one hydroxyl group in a mobile phase and in catalytic relationship with the carbohydrate material, wherein the organic compound catalyzes the reduction of the oxygen by the carbohydrate material at the temperature and relative humidity in the environment; and
   a carrier carrying the redox composition.

19. The article of claim 18, wherein the carrier comprises at least one of plastic, silica, diatomaceous earth, activated carbon, zeolites, oxides of silicon, aluminum or calcium, hydroxides of silicon, aluminum, and calcium, carbonates of calcium, carbonates of magnesium, montmorillonite, kaolite, attapulgite, sepiolite, talc, vermiculite, precipitated metal silicates, alumina, silica gels, aluminum phosphate, or clays.

20. The article of claim 18, further comprising a sachet containing the redox composition and the carrier, wherein the temperature in the environment is between about 2-degrees C. and about 50-degrees C. and the relative humidity in the environment is between about 2% and about 100%.

21. The article of claim 18, further comprising a catalytic molar amount of metal in catalytic relationship with the organic compound to promote oxidation of the organic compound, wherein the metal is present at a concentration from 1 ppm to 10000 ppm and comprises at least one of scandium, titanium, vanadium, chromium, manganese, iron, cobalt, nickel, copper, zinc, and organic complexes of the foregoing.

* * * * *